United States Patent
Miyata et al.

(10) Patent No.: US 7,668,911 B2
(45) Date of Patent: Feb. 23, 2010

(54) PRESENCE SERVER, SESSION CONTROL SERVER, AND PACKET RELAY SYSTEM

(75) Inventors: Tatsuhiko Miyata, Kokubunji (JP); Kenji Kasuga, Tokyo (JP); Kazuma Yumoto, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 743 days.

(21) Appl. No.: 11/050,015

(22) Filed: Feb. 4, 2005

(65) Prior Publication Data

US 2005/0216595 A1 Sep. 29, 2005

(30) Foreign Application Priority Data

Mar. 29, 2004 (JP) .............................. 2004-094154
Nov. 11, 2004 (JP) .............................. 2004-327168

(51) Int. Cl.
*G06F 15/16* (2006.01)

(52) U.S. Cl. ...................................... 709/204; 709/206

(58) Field of Classification Search ................ 709/204, 709/206, 227, 232

See application file for complete search history.

(56) References Cited

U.S. PATENT DOCUMENTS

| | | | |
|---|---|---|---|
| 6,108,709 A * | 8/2000 | Shinomura et al. ........... 709/239 |
| 6,564,261 B1 * | 5/2003 | Gudjonsson et al. ........ 709/227 |
| 7,359,938 B1 * | 4/2008 | Davies et al. ................ 709/204 |
| 2003/0009530 A1 * | 1/2003 | Philonenko et al. .......... 709/206 |
| 2004/0003046 A1 * | 1/2004 | Grabelsky et al. ........... 709/206 |
| 2004/0122896 A1 * | 6/2004 | Gourraud ..................... 709/204 |
| 2004/0267939 A1 * | 12/2004 | Yumoto et al. ............... 709/227 |
| 2006/0129643 A1 * | 6/2006 | Nielson et al. .............. 709/206 |
| 2007/0011230 A1 * | 1/2007 | Clech et al. ................. 709/204 |
| 2008/0086564 A1 * | 4/2008 | Putman et al. .............. 709/227 |

OTHER PUBLICATIONS

M. Day et al., "A Model for Presence and Instant Messaging", Network Working Group, Informational, (Feb. 2000), pp. 1-17.
M. Day et al., "Instant Messaging / Presence Protocol Requirements", Network Working Group, Informational, (Feb. 2000), pp. 1-26.

(Continued)

*Primary Examiner*—William C Vaughn, Jr.
*Assistant Examiner*—Thomas Richardson
(74) *Attorney, Agent, or Firm*—Stites & Harbison PLLC; Juan Carlos A. Marquez, Esq.

(57) ABSTRACT

The object of the invention is to make communication between users smoother utilizing terminal type information. To achieve the object, a terminal type is specified based upon information in login and information acquired by adding the information to presence information is notified. Besides, terminals of the same type are connected by an SIP server. The selection of the communication means of voice communications and a character chat when communication is started and the specification of a calling terminal at a partner terminal are enabled by adding terminal information to presence information and grasping mutual owned terminals. Detailed status can be grasped based upon presence information of the same name by grasping presence information and terminal information. Further, in the case of a terminal not provided with a presence function, an SIP server also identifies terminal type information by deputy and can also specify a calling terminal.

6 Claims, 25 Drawing Sheets

OTHER PUBLICATIONS

A. B. Roach, "Session Initiation Protocol (SIP)-Specific Event Notification", Network Working Group, Standards Track, (Jun. 2002), pp. 1-38.

H. Sugano et al., "Presence Information Data Format (PIDF)", Network Working Group, Internet-draft (May 2003), pp. 1-26.

* cited by examiner

FIG. 5

```
REGISTER sip:sipserver@abc.com SIP/2.0
To:UserA< sip:userA@abc.com >;tag=aaa
From:UserA<sip:userA@abc.com>
Max-Forwards: 100
Call-ID:125533268@a.ne.jp
CSeq: 33 REGISTER
Contact:<sip:userA@phone.com>;expire=3600, q=0.5
User-Agent: TVPhone/1.0 (xx Corp TV Phone)
Content-Length: 0
```

| TERMINAL ADDRESS | OWNER | SESSION STATUS | CURRENT STATUS | ... |
|---|---|---|---|---|
| TERMINAL A | UserA | OPEN | | ... |
| TERMINAL B | UserA | CLOSED | | ... |
| TERMINAL C | UserB | OPEN | | ... |
| TERMINAL D | UserC | CLOSED | | ... |
| TERMINAL E | UserD | OPEN | | ... |
| TERMINAL F | UserD | CLOSED | | ... |
| ... | ... | ... | ... | ... |

| TERMINAL ADDRESS | TERMINAL TYPE |
|---|---|
| TERMINAL A | IP PHONE |
| TERMINAL B | MEETING TERMINAL |
| TERMINAL C | TV PHONE |
| TERMINAL D | TV PHONE |
| TERMINAL E | IP PHONE |
| TERMINAL F | CHAT TERMINAL |
| ... | ... |

FIG. 8A

| LOGIN INFORMATION (User-Agent) | TERMINAL TYPE FOR INTERNAL MANAGEMENT |
|---|---|
| IPPhone | IP PHONE |
| ConfClient | CONFERENCE TERMINAL |
| TVPhone | TV PHONE |
| ChatClient | CHAT TERMINAL |
| PresenceClient | PRESENCE TERMINAL |
| IPTelephone | IP PHONE |
| NOTHING | IP PHONE |

FIG. 8B

| TERMINAL TYPE FOR INTERNAL MANAGEMENT | OUTPUT MODE (FOR SIP/SIMPLE) | OUTPUT MODE (FOR HTTP) |
|---|---|---|
| IP PHONE | urn:params:xml:ns:ip-phone | ... |
| CONFERENCE TERMINAL | urn:yyyy | ... |
| TV PHONE | urn:params:xml:ns:tv-phone | ... |
| CHAT TERMINAL | urn:aaaa | ... |
| PRESENCE TERMINAL | urn:bbbb | ... |

FIG. 9

```
<?xml version="1.0" encoding="UTF-8"?>
<impp:presence
    xmlns:impp="urn:ietf:params:xml:ns:cpim-pidf"
    xmlns:phone="urn:params:xml:ns:ip-phone"           ~111
    xmlns:tvphone="urn:params:xml:ns:tv-phone"         ~112
    entity="sip:userA@abc.com">
  <impp:tuple id="sip:userA@phone.abc.com">
    <impp:status>
      <impp:basic>open</impp:basic>
      <phone:availability>open</local:availability>   ~113
      <phone:sessionStatus>open</local:sessionStatus> ~114
    </impp:status>
    <impp:contact                                      ~117
            priority="0.8">sip:userA@phone.abc.com</impp:contact>
  </impp:tuple>
  <impp:tuple id="sip:userA@tvphone.abc.com">
    <impp:status>
      <impp:basic>open</impp:basic>
      <tvphone:sessionStatus>close</tvphone:sessionStatus>  ~115
      <tvphone:availability>busy</tvphone:availability>     ~116
    </impp:status>
    <impp:contact                                      ~118
            priority="1.0">sip:userA@tvphone.abc.com</impp:contact>
    <impp:note>I'll be in Tokyo next week</impp:note>
  </impp:tuple>
</impp:presence>
```

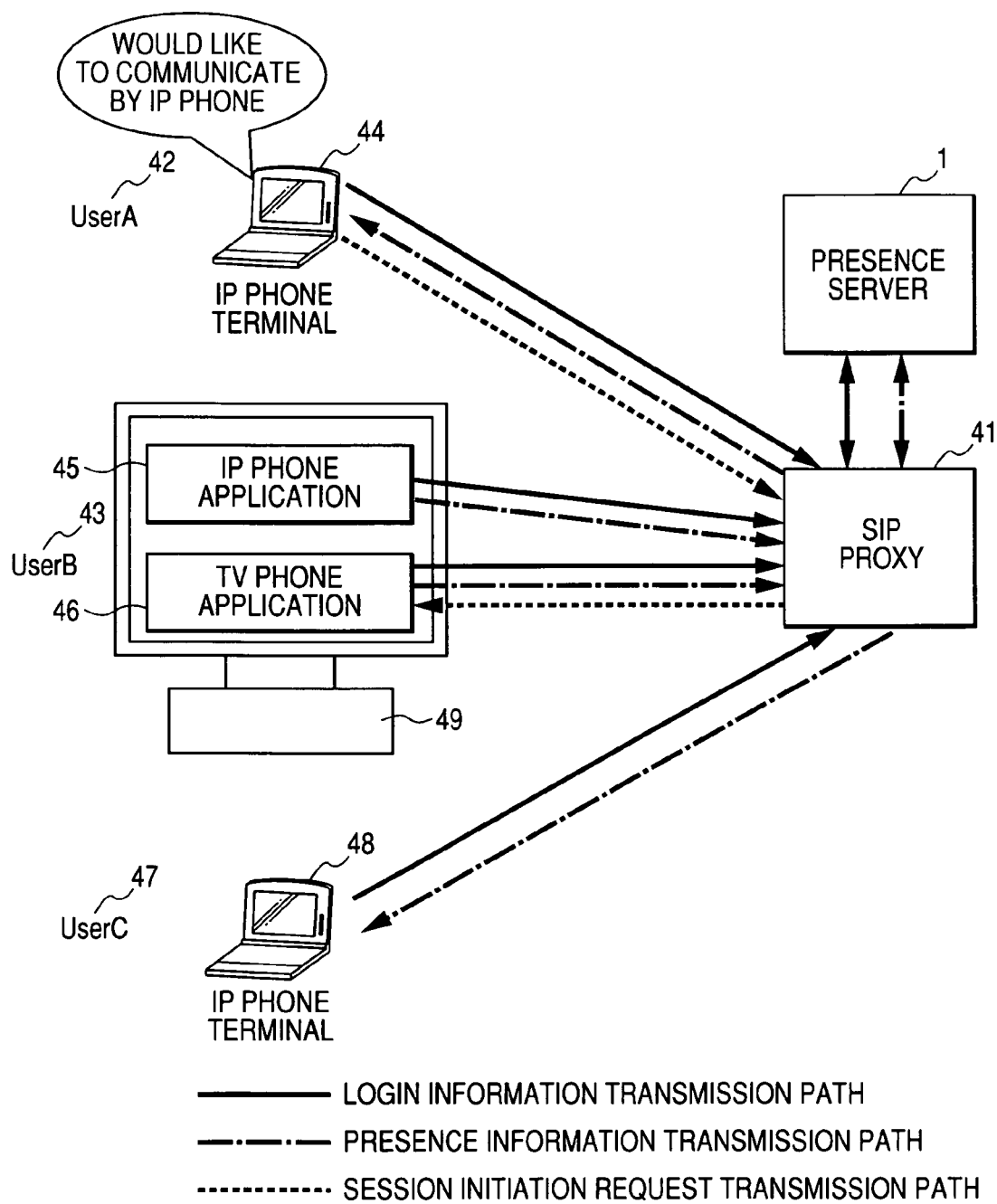

FIG. 12

| ACCESS USER | ACCESSED USER | PERMISSION INFORMATION |
|---|---|---|
| UserB | UserA | XXXXX |
| UserC | UserA | XXXXX |
| UserA | UserB | XXXXX |
| UserC | UserB | XXXXX |
| UserA | UserC | XXXXX |
| UserB | UserC | XXXXX |
| . . . | . . . | . . . |

FIG. 15

| TERMINAL ADDRESS | OWNER | SESSION STATUS | TERMINAL TYPE | DISPLAY FORMAT |
|---|---|---|---|---|
| TERMINAL A | UserB | CLOSED | IP PHONE | TELEPHONE SESSION |
| TERMINAL B | UserB | CLOSED | MEETING TERMINAL | MEETING SESSION |
| TERMINAL C | UserB | CLOSED | TV PHONE | TV PHONE SESSION |
| TERMINAL D | UserB | CLOSED | CHAT TERMINAL | CHAT SESSION |
| TERMINAL E | UserC | OPEN | IP PHONE | OPEN |
| TERMINAL F | UserC | OPEN | CHAT TERMINAL | OPEN |
| ... | ... | ... | ... | ... |

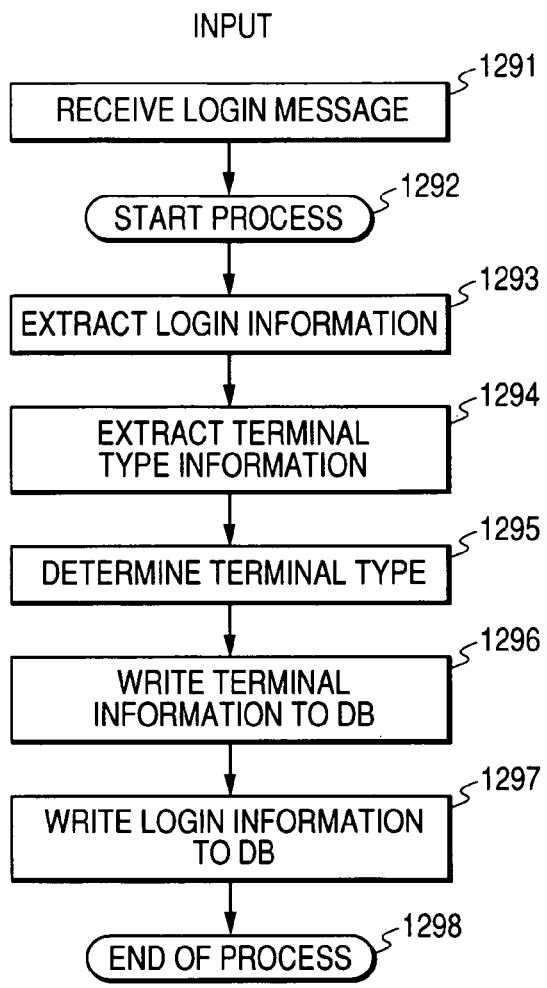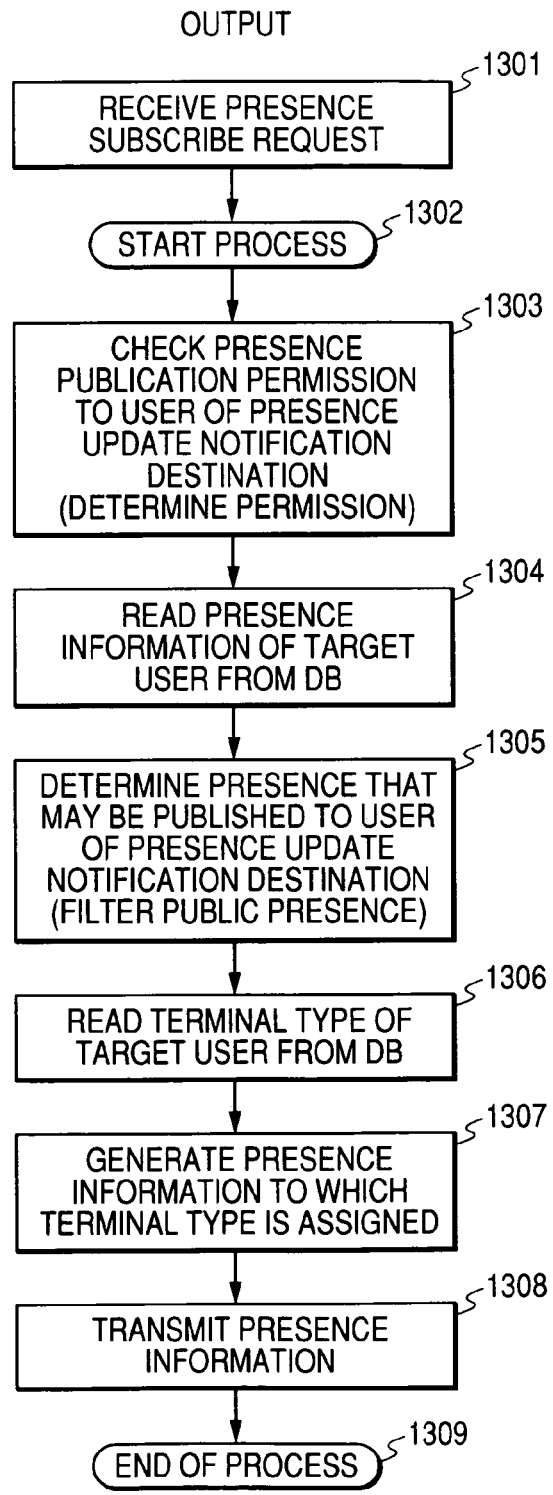

PRESENCE SERVER, SESSION CONTROL SERVER, AND PACKET RELAY SYSTEM

CLAIMS OF PRIORITY

The present application claims priority from Japanese applications JP 2004-327168 filed on Nov. 11, 2004 and JP 2004-094154 filed on Mar. 29, 2004, the contents of which are hereby incorporated by reference into this application.

FIELD OF THE INVENTION

The present invention relates to a method of setting the publication of information.

BACKGROUND OF THE INVENTION

Recently, communication technology adopting status grasping technique utilizing a concept called "presence" is vigorously developed. "Presence" means the current status of a user. It is enabled by notifying "presence" to another user at real time to grasp mutual current status. The communication technology adopting "presence" includes instant messaging (IM) as representative communication technology executed at the current stage. The concept of IM using presence information and its notification method are standardized with Instant Messaging and Presence Protocol (impp) working group of Internet Engineering Task Force (IETF) in the center. The contents standardized in the impp working group are described in a non-patent document 1 and a non-patent document 2.

Heretofore, the status grasping technique using "presence" is provided mostly in the form that the technique is added to IM service and a protocol acquired by extending a protocol for IM service originally configured by each company is used. However, recently, standardization at a level of a protocol is positively made. For example, in "Session Initiation Protocol (SIP) for Instant Messaging and Presence Leveraging Extensions" (SIMPLE) working group of IETF, a presence information transmission/reception protocol acquired by extending a session initiation protocol (SIP) utilized in an IP phone and others is standardized. In a non-patent document 3 and other Internet drafts, its standard specifications are described. Recently, some companies try to integrate a protocol of IM service developed by each company with service using SIP such as the IP phone and a TV phone in accordance with SIMPLE standard. Besides, there is also movement to develop a presence server according to SIMPLE standard and to propose the usage of presence in a form in which presence is separated from IM service.

IM service basically premises service on one terminal of one user. For example, suppose that a user A utilizing IM service owns plural terminals, a terminal A and a terminal A' and currently utilizes IM service on the terminal A. In case the user A simultaneously logs in an IM server on the terminals A and A', the current IM server cannot judge to which of the terminals A and A' the server should transmit an instant message to be transmitted to the user A from a user B who is another user. In the current IM service, when the user A tries to log in on the terminal A' in case the user A logs in on the terminal A, a measure is taken by providing a mechanism for preventing double login such as forced logout on the terminal A on the side of the server.

In case SIP is used, a model that allows double login exists. However, the function is specific to the IP phone. The reason is that SIP is a standard that originally targets the IP phone. The model of double login by SIP will be described below.

FIG. 13 shows a state in which a user B denoted by 312 logs in an SIP server 41 on two IP phones denoted by 314, 315. At this time, the user B transmits REGISTER message of SIP to log in the SIP server 41 from the two terminals 314, 315. FIG. 5 shows the contents of the REGISTER message. Priority can be specified by specifying q-value denoted by 73 shown in FIG. 5 when the REGISTER message is transmitted on each terminal. Numerals 0 to 1 are specified in q-value and the terminal where a higher value is specified is regarded as the one having higher priority. For example, when 0.5 is specified in q-value on the IP phone terminal 1 denoted by 314 and 0.7 is shown in q-value on the IP phone terminal 2 denoted by 315, the SIP server 41 hereafter gives priority over the IP phone terminal 2 because the IP phone terminal 2 denoted by 315 has a higher value in q-value. When a user A calls the user B in this state, the SIP server 41 calls the IP phone terminal 2 having higher priority out of the terminals in which the user B logs. In the standard of SIP, the double login of the terminals is managed according to the above-mentioned method.

[Non-patent document 1] RFC 2778
[Non-patent document 2] RFC 2779
[Non-patent document 3] RFC 3265
[Non-patent document 4] IETF Internet Draft draft-ietf-impp-cpim-pidf-0.8.txt In conventional type IM service, the IM server manages only a screen name (user ID) of a user who logs in and the corresponding online/offline status information and does not manage the type information of his/her terminal. In view of a situation in which SIP is installed of an IM system of each company, possibility that the system is configured based upon a common protocol such as SIP and the IM service and other service are managed with the configured system as a common platform is high. Therefore, afterward, it is estimated that various types of terminals such as an IM terminal, an IP phone and a chat terminal will be connected on the common platform. Further, it is estimated that not only a different terminal will be connected every application but the same terminal on which plural applications are executed will be connected to the common platform. Therefore, when a method of utilizing presence information which is performed in the conventional type IM service is applied as it is in case various service using presence information is developed on a network, it is considered that inconvenience shown in FIG. 11 will occur.

FIG. 11 is a schematic drawing showing a case that a user A who owns an IP phone terminal 211 calls a user B who owns plural terminals 213 to 216 via the SIP server. Suppose that the IP phone terminal 211 of the user A is connected to a presence server that manages the presence information of each terminal user and as a result, the IP phone terminal knows the presence information of the user B shown in a balloon 217. Also suppose that each terminal is connected to the SIP server as a session management server and the SIP server executes the communication control of each terminal. A full line shows a transmission path of a session signal communicated between the terminal and the SIP server and an alternate long and short dash line shows a transmission path of presence information.

The conventional type IM server manages a screen name of the user A and status information that the user A' terminal 211 is turned online in pairs. In case a method of managing presence information in IM service is applied to the presence server as it is, the presence server manages user ID and the corresponding online/offline status information in pairs. Suppose that the user B simultaneously instructs a TV phone terminal 213, an IP phone terminal 214, a meeting terminal 215 and an IM terminal 216 to log in. As the presence server manages user ID, it can notify the user A of the online/offline status information of each terminal of the user B as shown in the balloon 217. Then, suppose that the user A would like to call the IP phone terminal B which is currently online of the user B. Needless to say, in case the user A knows all the address information of the user B, communication between the user A and the user B itself is possible. However, as the presence server does not manage the type of each terminal, the user A does not know which of the partner's terminals is the IP phone terminal even if the user A would like to communicate by the IP phone. Therefore, the destination terminal which the user B actually calls out of the terminals owned by the user B cannot be specified.

As described in the prior art, a model that one user doubly instructs plural terminals to log in exists in SIP, however, in this model, inconvenience occurs. For example, suppose that the terminal 315 is not an IP phone terminal but a terminal such as a TV phone terminal and a meeting terminal except an IP phone. As the SIP server 41 does not recognize it, the user A calls the terminal having the highest priority out of the terminals which the user B instructs to log in and except the IP phone even if the user A calls the user B by the IP phone in this state. As a result, the type of the terminal to which the user A transmits and the type of the terminal where the user B receives are different and no call comes into effect.

As described above, in case only an IP phone exists on an SIP network, the double log-in model comes into effect, however, in case various terminals except an IP phone exist, inconvenience occurs in the model using the q-value.

When a terminal type is diversified by making a protocol common, an amount of information may be short by only the following presence information when each terminal utilizes the presence information having the same name. For example, a balloon 227 shown in FIG. 11 shows a state in which each terminal utilizes presence information of a name "closed" in common. Suppose that each terminal 213 to 216 registers the current session status of each terminal at an either value of "closed" or "open" in a part in which the name of the presence information is called "session status". The user A can acquire the current session status of each terminal owned by the user B from "session status". However, no concrete calling means is described in "session status". Therefore, even if the following result is shown as denoted by 227 as a result of acquiring presence information, it is unknown by what means a call is actually made. Therefore, the user A can grasp a partner's state only at a level that the user A who is an originator cannot communicate with the user B currently because the user B on the receive side is simply communicating with someone. If the user B actually communicates by character chat, the user A interrupts it, however, the user A can ring a telephone in an emergency and at this time, the user on the side of an originator loses one timing of communication.

SUMMARY OF THE INVENTION

To solve the above-mentioned problem, the object of the invention is to extract a terminal type from login information in login in each terminal and to hold it in a presence server. The object is also to add terminal information to presence information when another user is notified of the presence information and to notify it.

When each user communicates, he/she can grasp a type of a terminal which a partner user instructs to log in. Hereby, an originator who would like to communicate can check communication means which a partner user can currently take and can specify a partner user terminal that accords with communication means which the originator desires.

Besides, detailed presence information can be acquired based upon a terminal type even in the same presence item by adding the terminal type to the presence information. For example, even if presence information of a name "session status" is "closed", a user can judge that "closed" means "telephone session" when the user knows that the information relates to an IP phone, can judge that "closed" means "meeting session" when the user knows that the information relates to a meeting terminal, and can judge that "closed" means "chat session" when the user knows that the information relates to a chat terminal.

BRIEF DESCRIPTION OF THE DRAWINGS

FIG. 5 shows the details of a transmission message in login using SIP;

FIG. 6 shows a table including presence information stored in the presence server according to the invention;

FIG. 7 shows a table for managing the types of log-in terminals stored in the presence server according to the invention;

FIGS. 8A and 8B show tables for managing terminal type information stored in the presence server according to the invention;

FIG. 9 shows an example of a description format of presence information transmitted to an external device by the presence server according to the invention;

FIG. 10 shows a network showing a session mode using the presence server according to the invention;

FIG. 12 shows a table for permission information stored in the presence server according to the invention;

FIG. 15 shows a table when a user terminal stores terminal type information used in the invention;

FIGS. 26A and 26B are flowcharts when a terminal type is identified in the presence server according to the invention and when presence information is notified.

DETAILED DESCRIPTION OF THE PREFERRED EMBODIMENTS

In this embodiment, first, the structure and the operation of a presence server and a network for realizing service using the presence server will be described. Afterward, the structure and the operation of an SIP server to which an SIP message routing method according to the invention is applied will be described.

Figure 1:
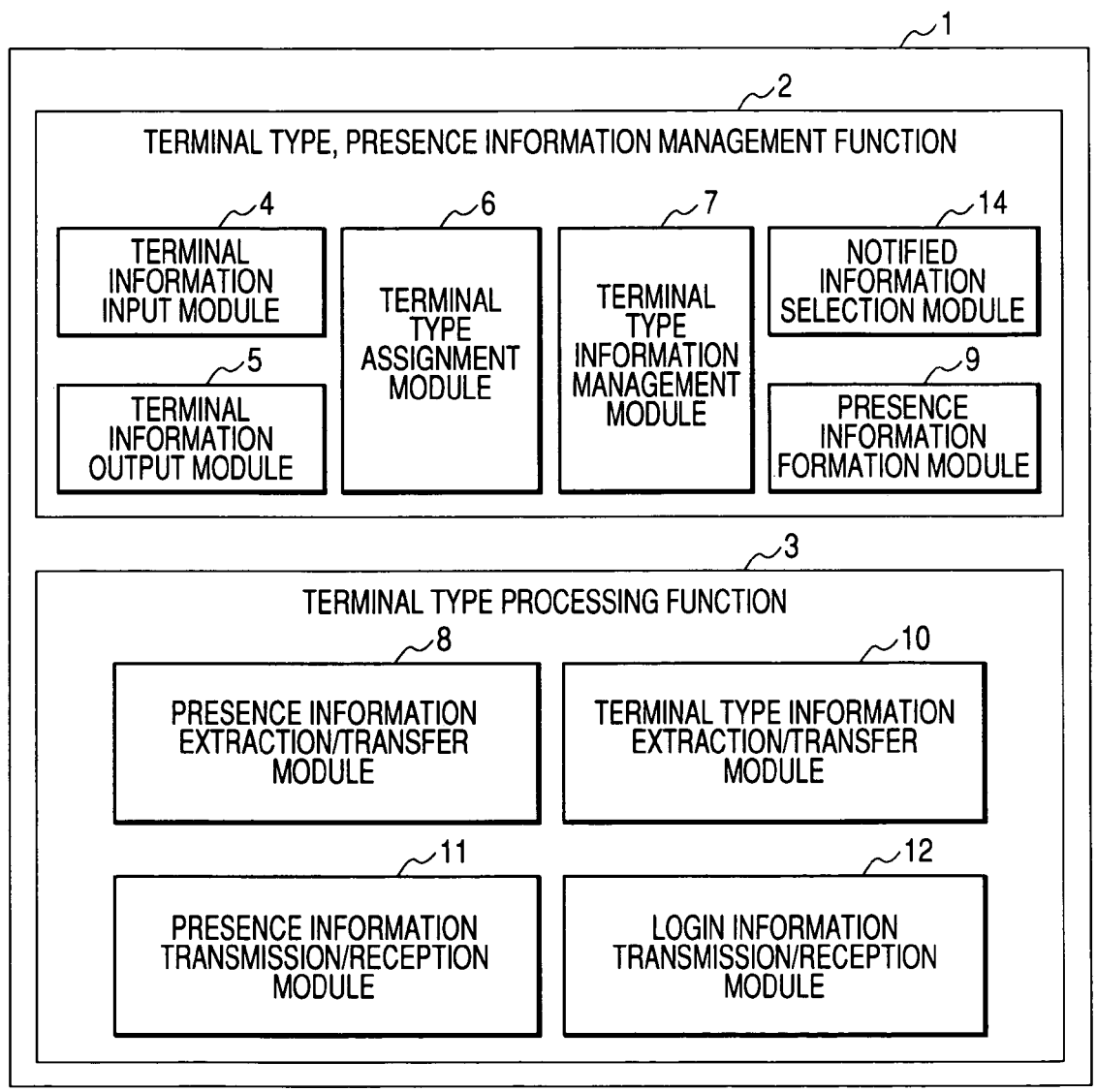
FIG. 1 is a functional block diagram showing a presence server to which a terminal type management method according to the invention is applied.

FIG. 1 a schematic functional block diagram showing the presence server equivalent to this embodiment. In FIG. 1, logical functional configuration realized by software is shown, however, each functional block may be also configured by hardware.

Figure 2:
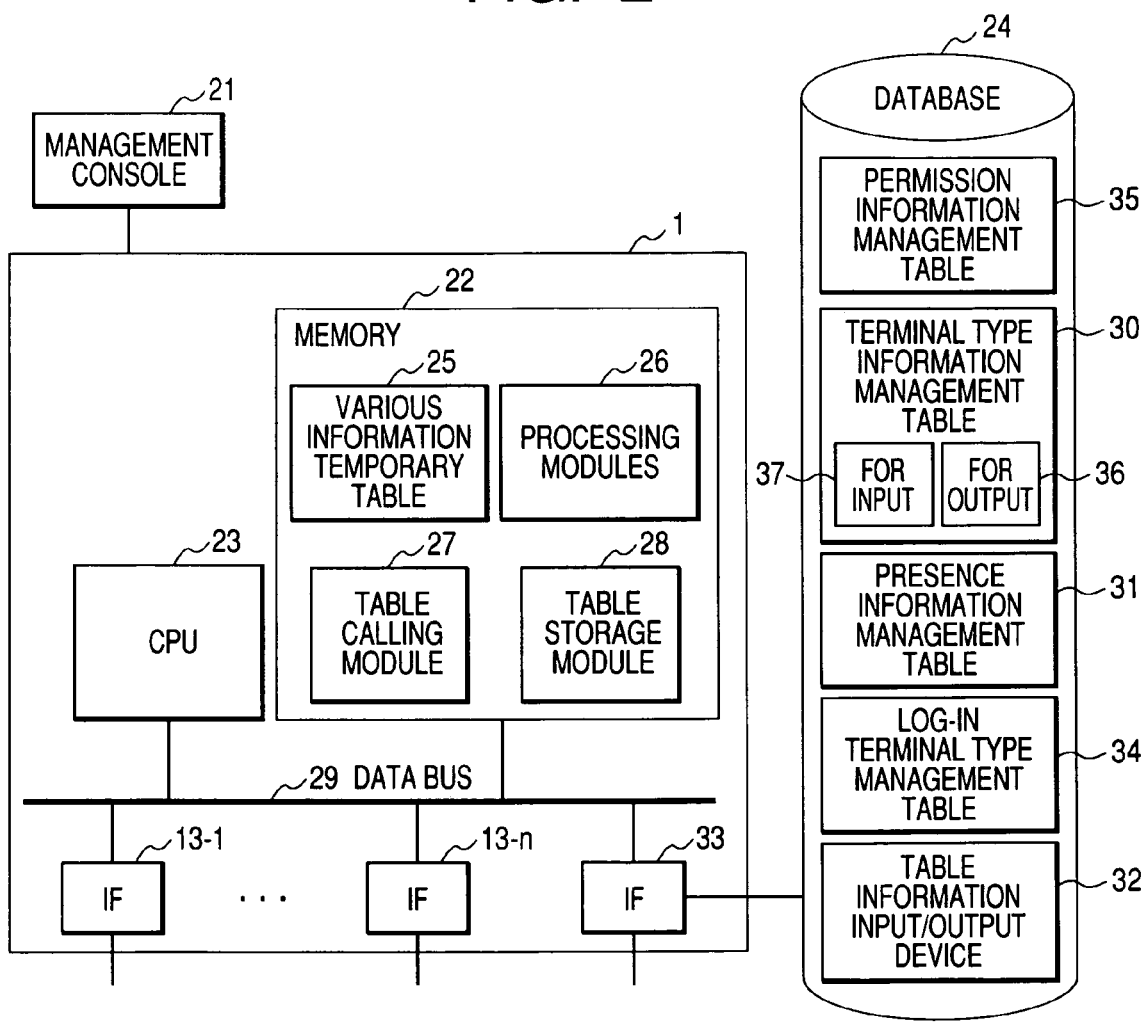
FIG. 2 shows the presence server to which the terminal type management method according to the invention is applied.

FIG. 2 shows how the functional blocks shown in FIG. 1 are realized by hardware. The operation of various functional blocks shown in FIG. 1 is stored in a processing module group 26 in a memory 22 shown in FIG. 2, CPU 23 reads and executes its operational procedure in operation. Terminal type information required when an individual processing module is operated is stored in a terminal type information management table 30 in a database 24 and presence information is stored in a presence information management table 31 in the database 24. These information items are timely stored in a various information temporary table 25 in the memory 22 via an interface 33 when the presence server 1 is utilized and processing is executed in CPU 23. The result is written to the database 24 via the interface 33.

FIG. 26 is a flowchart showing the processing of the functional block groups shown in FIG. 1. Each functional block is operated according to the flowchart shown in FIG. 26 when a message is input/output.

Figure 3:
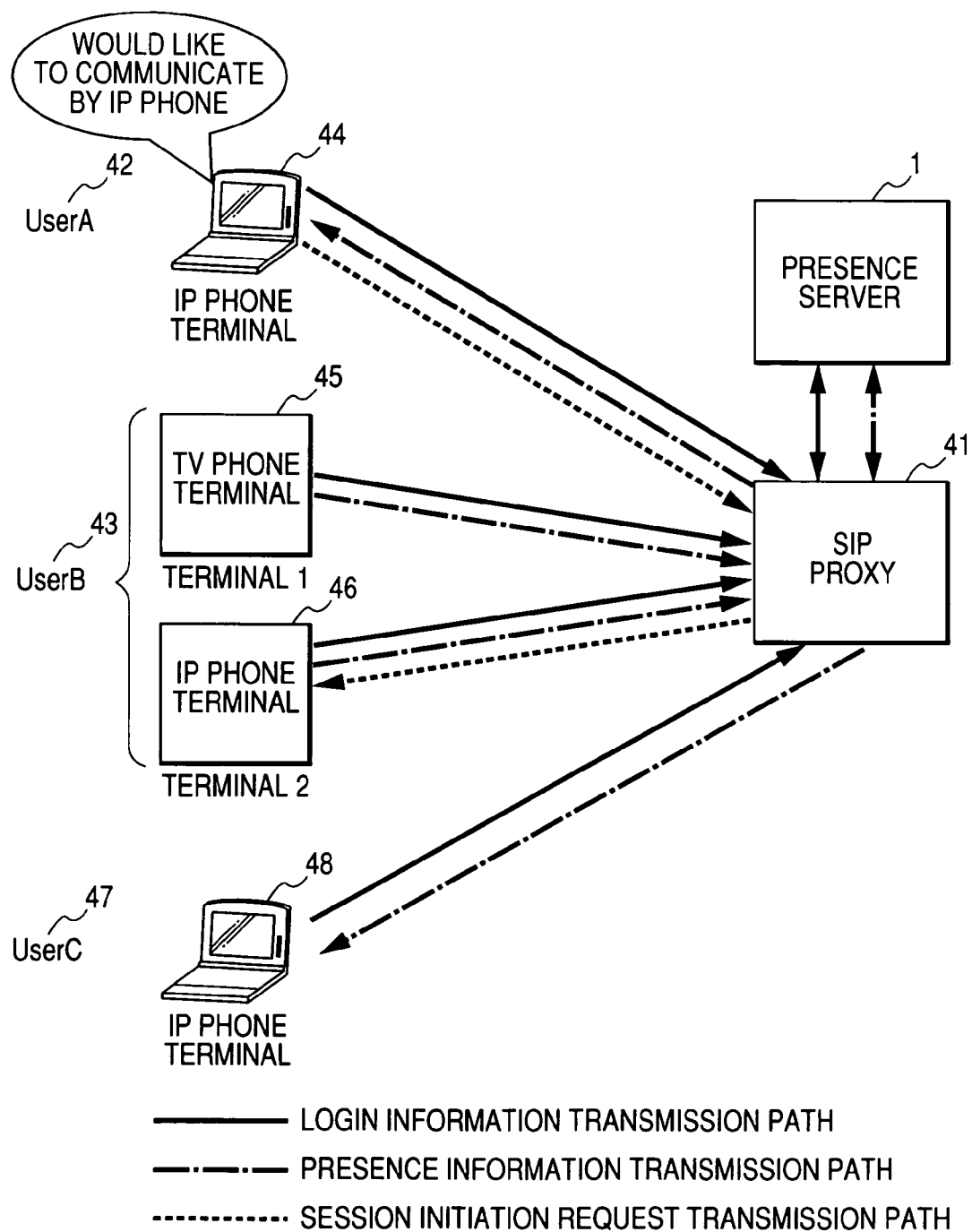
FIG. 3 shows a network showing a session mode using the presence server according to the invention.
Figure 4:
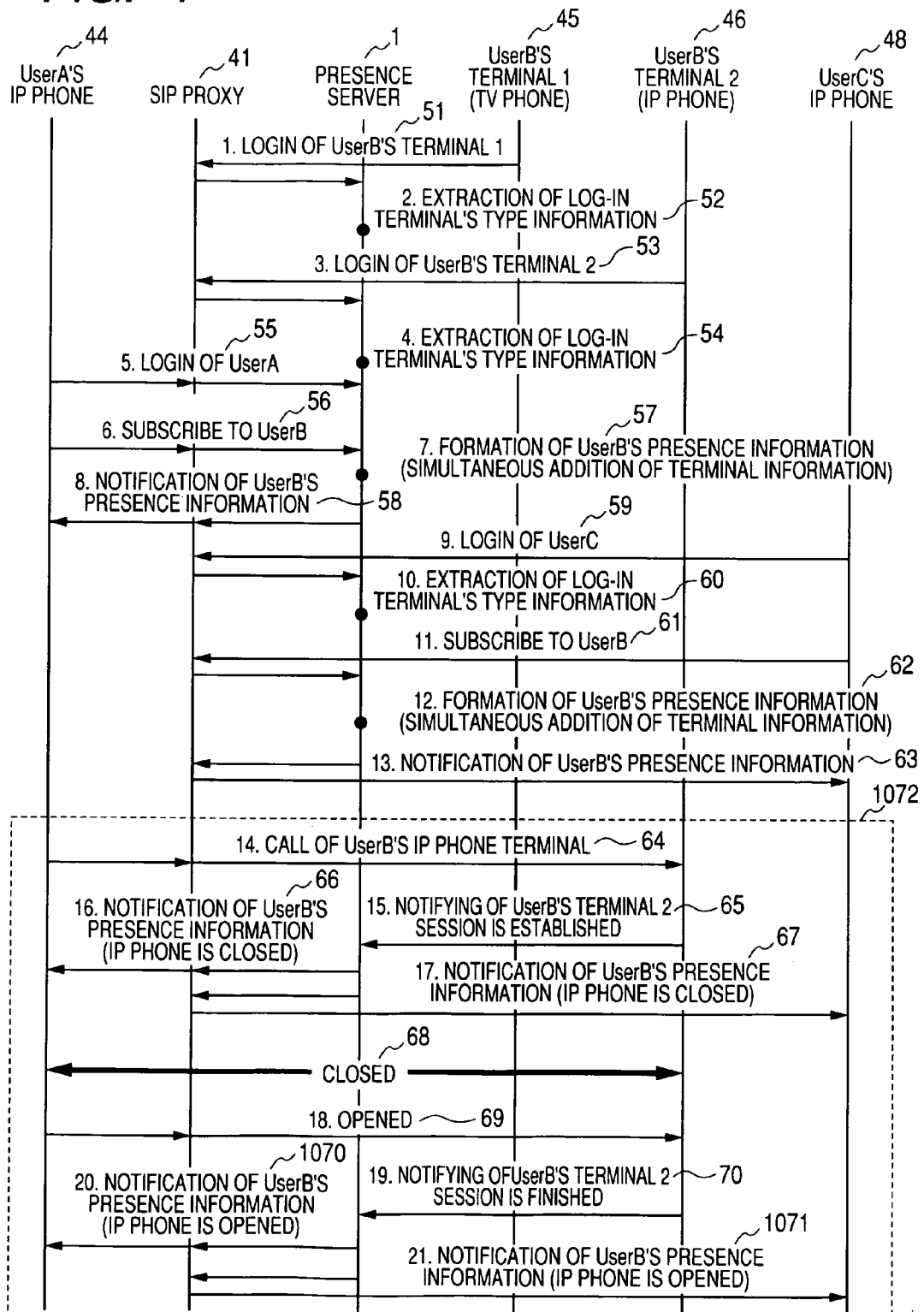
FIG. 4 shows an operational sequence in the session mode using the presence server according to the invention.
Figure 11:
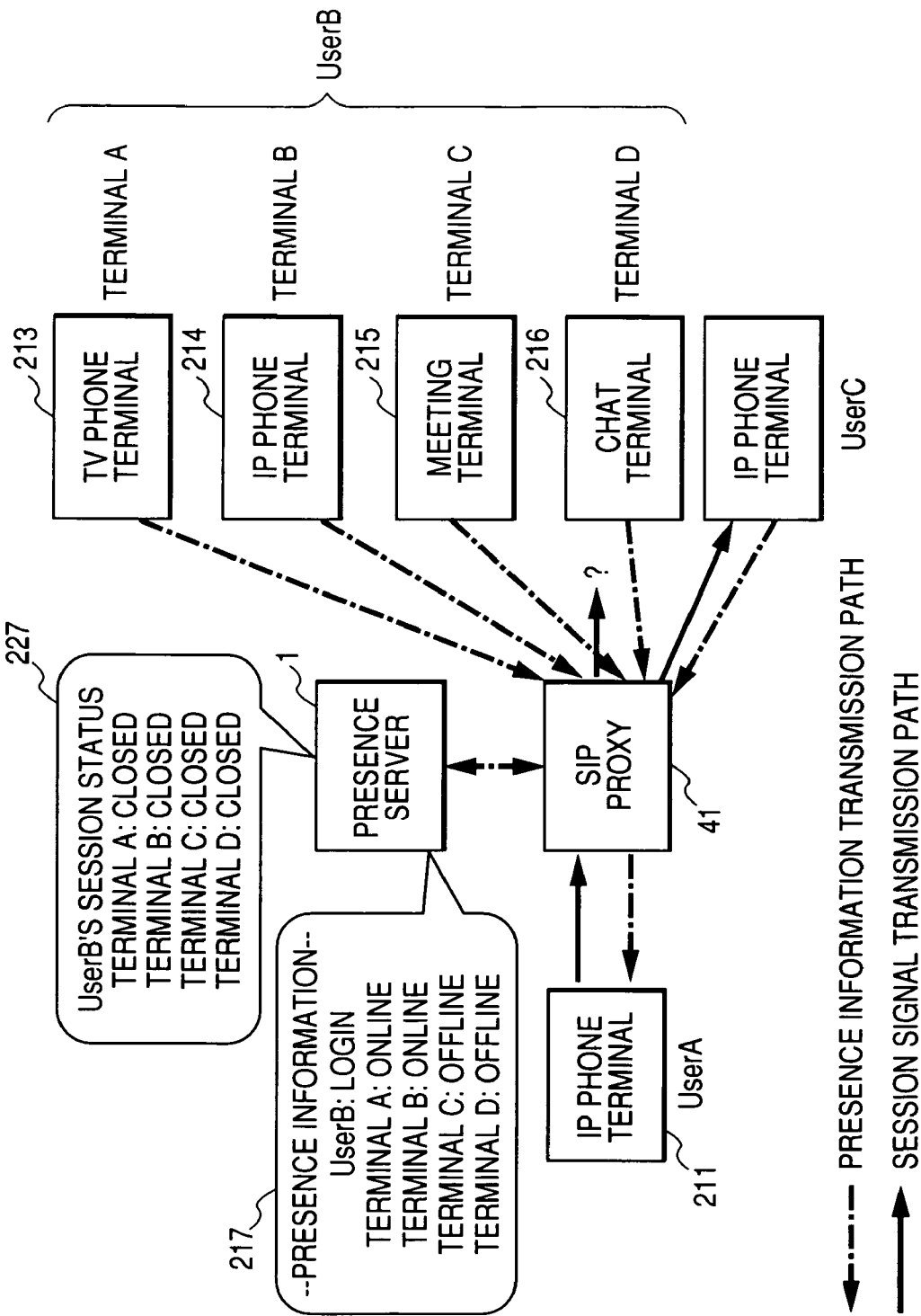
FIG. 11 is an explanatory drawing for explaining a problem that occurs in case presence information service performed in IM service is provided in a network using an SIP server.
Figure 13:
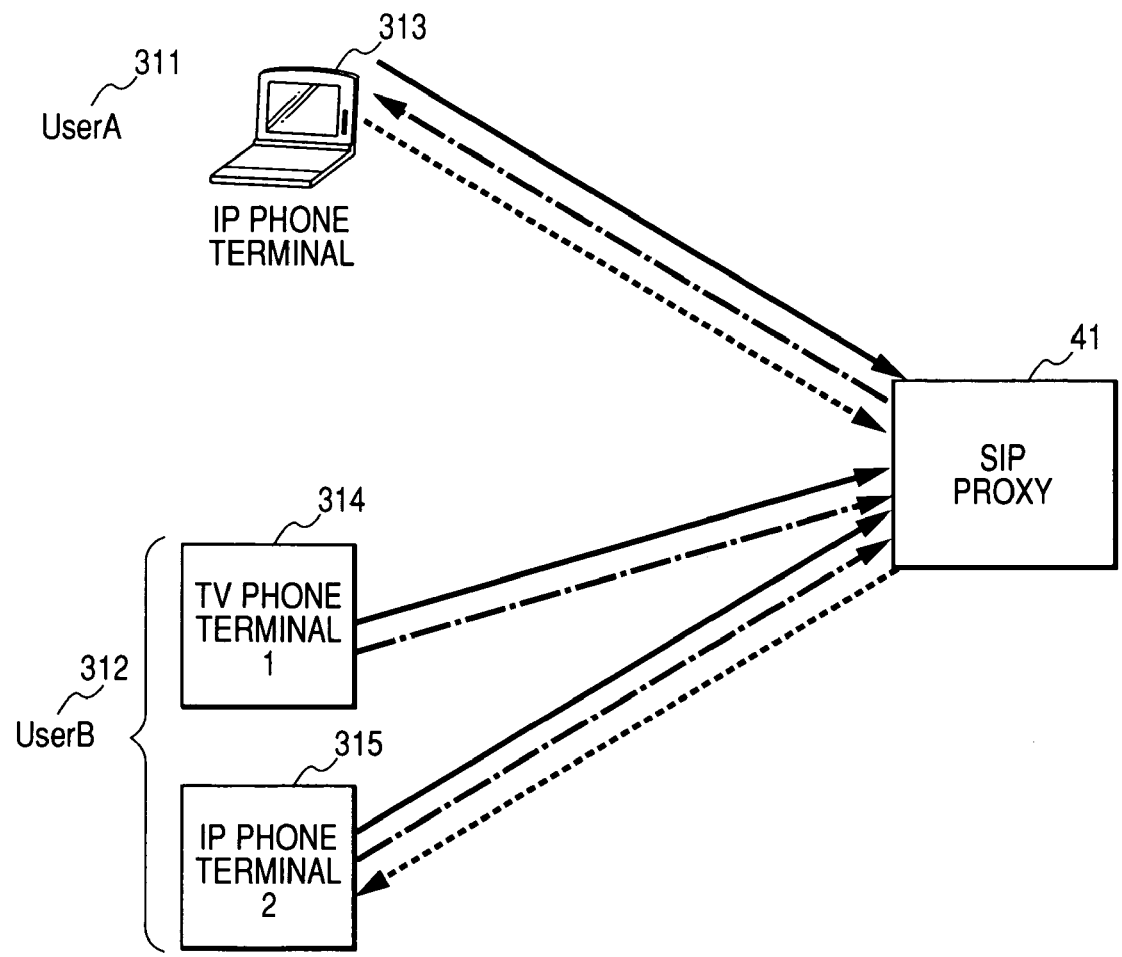
FIG. 13 shows a network showing a session mode in case one user doubly logs in the prior art.

FIG. 3 shows a network in an example of service using terminal type information and FIG. 4 shows its sequence. In this example, a user B denoted by 43 in FIG. 3 logs in the SIP server 41 and the presence server 1 on terminals 45, 46 owned by the user B. A user A denoted by 42 and a user C denoted by 47 also log in them and subscribe to the terminals 45, 46 of the user B denoted by 43. Afterward, the user A communicates with the user B by an IP phone. The whole operation from extracting terminal type information to notifying another user of presence which is provided with terminal information will be described referring to these drawings below. In this example of service, a presence system is operated using SIP for a protocol, however, SIP is not essential to configure the presence system and another protocol can be also utilized. In case another protocol is utilized, the concrete contents of a message and a detailed sequence are different, however, a basic concept is unchanged. Further, in FIG. 3, the terminals 45, 46 owned by the user B denoted by 43 are shown as different hardware, however, there is also a case in which the terminals are dealt as different applications 45, 46 on the same hardware 49 as shown in FIGS. 26.

First, in a step 51 shown in FIG. 4, the user B logs in the SIP server 41 and the presence server 1 on the TV phone terminal 45. FIG. 5 shows the contents of an SIP message in login. In SIP, in login, a message using REGISTER method is transmitted.

Next, the presence server 1 registers a contact address 71 described in a contact header in a login message shown in FIG. 5 as a terminal address. In a step 52, the presence server recognizes terminal type information. Referring to FIG. 26A, the contents of concrete processing in the step 52 will be described below. When the presence server 1 receives a message via an interface 13-1 to 13-*n* shown in FIG. 1 in a step 1291, it starts terminal type extracting processing in a step 1292. First, the presence server transfers to a login information transmission/reception module 12 and extracts login information in a step 1293, that is, extracts the contact address 71. In a step 1294, a terminal type information extraction/transfer module 10 extracts a user-agent header value 72 of the login information and transfers the information to a terminal type information management module 7. In this embodiment, the presence server judges a terminal type based upon a user-agent header, the presence server may also judge a terminal type in another method. For example, a method of adding a parameter assigned to the contact header for extending the original header on its own terms is conceivable. For an example in case a parameter is assigned to the contact header, description "Contact:<sip:UserA@abc.com>; agent=TVPhone" is conceivable. In case a method of judging a terminal type is changed, the processing of the terminal type information extraction/transfer module 10 is changed.

Next, the presence server 1 estimates a terminal type based upon the terminal type information extracted in the step 1294 and stores it together with login information. Its concrete processing will be described below. The terminal information transferred from the terminal type information extraction/transfer module 10 is received by the terminal type information management module 7. The terminal type information management module 7 manages a table 101 shown in FIG. 8A in a table for input 37 in a terminal type information management table 30 of the database 24 shown in FIG. 2. A terminal type judgment process in a step 1295 is executed utilizing this table 101. A table 106 shown in FIG. 8B managed in a table for output 36 shown in FIG. 2 is a table for outputting presence information, however, the tables 101 and 106 can be also managed in the same table in view of utilization in the database. In this embodiment, the TV phone terminal 45 which is a log-in terminal and which is owned by the user B adds terminal type information "TVPhone/1.0(xxCorp TV Phone)" to login information. In RFC 3261 of IETF in which a standard of SIP is described, it is described that a description format of a user-agent header value is similar to that in RFC 2616. As a description format of a user-agent header value is defined as [terminal name]/[version number] ([comment]) in RFC 2616, the terminal type information of the log-in terminal is judged "TVPhone" which is a value acquired by subtracting a version number and a comment from the user-agent header value 72 in the step 1295. In the method of dealing with the user-agent header value, logic except that described in this embodiment may be also utilized. In this embodiment, only "terminal name" is utilized for terminal type information, however, a pattern in which "version number" and "comment" are utilized for terminal type information is also conceivable.

In the above-mentioned process, the terminal type information of the log-in terminal is judged "TVPhone". Next, in the step 1295, the table for input 101 of the terminal type management table is retrieved to judge an actual terminal type based upon terminal type information. It is login information (the user-agent header) 102 that is retrieved and a retrieval key is terminal type information "TVPhone". The result of retrieval "TVPhone" can be judged a TV phone based upon a terminal type for internal management 103. When the terminal type information management module 7 judges a terminal type, it transmits the data to a terminal information input module 4. A terminal information output module 5 registers the information in a log-in terminal type management table 34 of the database 24 via the interface 33 in a step 1296. The log-in terminal type management table 34 is configured by a table according to a format shown in 91 in FIG. 7 and a data record having a terminal type 93 and log-in terminal ID 92 in pairs is added to the table. The presence server 1 describes the information of the log-in terminal in the presence information management table 31 of the database 24 which is a table for managing the log-in state of the terminal and presence information in a step 1297 at the same time as the proper processing. The presence information management table 31 is configured by a table according to a format shown in 81 in FIG. 6 and adds a data record having a terminal address 82 which is ID of the log-in terminal and an owner 83 of the terminal in pairs. Presence information such as the other session status 84 and the current status 85 is separately registered in a method different from a login process. In this embodiment, presence information and login information are dealt as separate sequences, however, they may be also dealt as one sequence utilizing the same message.

Next, the user B denoted by 43 instructs the IP phone terminal 46 to log in in steps 53, 54, however, a procedure of the presence server 1 at this time is similar to that in the steps 51, 52. However, a user-agent header value of a log-in message transmitted to the SIP server 41 and the presence server 1 by the IP phone terminal 46 is different from the value shown in 72 in FIG. 5. This reason is that the TV phone terminal 45 and the IP phone terminal 46 are different in a terminal type. As a result, the presence server 1 recognizes the IP phone terminal 46 as a terminal type different from that of the TV phone terminal 45. This is also similar in case no user-agent header is used for terminal type information, different terminal type information is necessarily added to a different terminal and login is made.

Afterward, the user A denoted by 42 instructs the IP phone terminal 44 to log in, however, the procedure of the presence server 1 at this time is also similar in that in the steps 51, 52.

Suppose that the types of the IP phone terminals 44 and 46 are the same, however, as to the terminal 44, "IPPhone" is described as a user-agent header value and as to the terminal 46, "IPTelephone" is described. That is, the case is a case in which different user-agent header values are described though they are the same type. For example, possibility that the user-agent header values of the same IP phone terminals are different depending upon vendors that develop them is conceivable. The presence server 1 maps such terminals in which different user-agent header values are described though the terminal types of them are the same as the same terminal type. This reason is that management is made as in two records 1101, 1102 described in the table 101 shown in FIG. 8A and even different user-agent headers 102 are mapped in the same terminal type for internal management 103 and in the same output mode (for SIMPLE) 104. Terminals designed by multiple vendors can be classified depending upon a function and service by preparing a table which functions as a dictionary for translating terminal type information of which each terminal notifies to terminal type information for internal management when the terminal type information is managed as described above. Further, some vendors may not append such ID of a terminal type in login. For such a terminal, a method of uniformly mapping in a terminal type which is default as in a record 1103 is conceivable. A method of judging a terminal type using a different method is also conceivable.

Next, the user A denoted by 42 transmits an information acquisition request to the presence server 1 in a step 36 to check the current presence information of the user B denoted by 43 and reserve notification when presence information hereafter changes. In case SIP/SIMPLE is utilized for an interface, a message utilizing SUBSCRIBE method as described in the non-patent document 3 is transmitted.

The presence server 1 that receives the message executes processing for notifying the presence information of the user B to the user A in a step 57 shown in FIG. 4. Referring to FIG. 26B, the concrete contents of the processing will be described below. When a request for the notification of presence information is made inside the presence server 1 in a step 1301, processing for notification is started in a step 1302. First, in a step 1303, it is checked whether the user B permits the user A the publication of his/her presence information or not. Concretely, permission information described in a permission information management table 35 in the database 24 shown in FIG. 2 is retrieved. FIG. 12 shows the concrete configuration of the table. The table 35 includes an access user 302 that requests to read presence information, an access target user 303 who is a user publishing presence information and permission information 304 in which the presence publication policy of the access target user is described. In the permission information, each presence information and permission information every terminal, that is, the setting of whether presence information is to be published or not are described. In this embodiment, as the user B reads the presence information of the user A, retrieval is made in a state in which a retrieval key is located in User B in a column 302 and is located in User A in a column 303. The retrieved permission information is temporarily stored in the various information temporary table 25 shown in FIG. 2 to utilize when presence information is configured later.

The presence server 1 acquires all the presence information of the user B from the presence information management table 31 of the database 24 shown in FIG. 2 via the interface 33 using the terminal information output module 5 in a step 1304 after presence information publication permission is verified. The presence information of the user B means the presence information of both the TV phone terminal 45 and the IP phone terminal 46 respectively owned by the user B. Presence information acquired from the database 24 is held in the various information temporary table 25 in the memory 22 shown in FIG. 2 to configure the subsequent presence information. Next, the presence server 1 selects presence information in which notification to the user A is permitted based upon the user B's presence information held in the various information temporary table 25 in a notified information selection module 14 shown in FIG. 1 in a step 1305. This processing is executed using the permission information retrieved formerly and temporarily held in the various information temporary table 25 of the user B for the user A. Presence information the publication of which is not permitted is filtered in this step. The filtered presence information of the user B is transferred to a presence information formation module 9.

Next, in a step 1306, the terminal type information management module 7 is inquired, and the terminal type information of each terminal and additional information when presence information is configured are acquired. A method of notifying presence information is different every protocol. Therefore, a method of adding terminal type information is also different every protocol. In the terminal type information management table denoted by 106 in FIG. 8B, an output mode in each protocol is described. The output mode is changed every protocol and presence information is notified. In this embodiment, an output mode for HTTP is described in 105 except SIP/SIMPLE. Next, in a step 1307, the contents of notice are configured in a format when the presence information formation module 9 notifies the user A.

In this embodiment, presence information is notified the user A using a format called Presence Information Data Format (PIDF) defined in the non-patent document 4. The name space function of exchange Markup Language (XML) which is the original format of PIDF is utilized for the addition of terminal type information. FIG. 9 shows an example of configured presence information. In 111, 112 in FIG. 9, name space for an IP phone and a TV phone described in FIG. 8 is defined. The definition of XML is required to be described first to utilize name space. The user B denoted by 43 in FIG. 3 owns two terminals of the TV phone terminal 45 and the IP phone terminal 46 and as both presence information is notified the user A, two name space is defined to identify the terminal types of the two terminals. Default when the name space is represented is declared in the defined part and afterward, in case name space is added to an XML sentence, a character string of the default has only to be described as a prefix. In this embodiment, a prefix of name space for a TV phone terminal is defined as "tvphone" and a prefix of name space for an IP phone is defined as "phone".

For presence information afterward described, an XML prefix representing a terminal type is added to a front part of a name of presence information. As in 113, 114 shown in FIG. 9, the current status (the availability) of an IP phone and a session status are written, a prefix is "phone". As in 115, 116, the current status of a TV phone and session status are written, a prefix is "tvphone". In this embodiment, terminal information is given utilizing XML name space, however, a terminal type is considered one presence information and a method of describing in parallel with other presence information is also conceivable.

The presence information generated in the above-mentioned process is transferred to a presence information transmission/reception module 11 shown in FIG. 1 in a step 1308 and is transmitted to the user A in a step 58 shown in FIG. 4 in an SIP message using NOTIFY method defined in the non-patent document 3.

Suppose that afterward, the user C denoted by 47 in FIG. 3 logs in on an IP phone terminal 48 which he/she owns. A procedure from the step 59 to the step 63 shown in FIG. 4 is similar to that in case the user A logs in and the user C reads the user B's presence information.

Next, suppose that the user A denoted by 43 in FIG. 3 tries to call the user B utilizing the IP phone terminal 44 owned by him/her. The user A can grasp which of the terminals owned by the user B is the IP phone terminal based upon the user B's presence information received in the step 58. Concretely, a terminal address is verified based upon terminal ID (an SIP address) described in 117, 118 and the type of each terminal is verified based upon the XML name space. Therefore, the user A can directly ring the IP phone terminal 46 owned by the user B denoted by 43 in FIG. 3 and never calls the TV phone terminal 45 by mistake.

In a step 64 shown in FIG. 4, the user A calls the user B and starts conversation. At that time, the IP phone terminal 46 owned by the user B notifies the presence server 1 that the IP phone terminal is in session status in a step 65. The presence server 1 notifies the user A and the user C who reserve notification that presence information is updated in steps 66 and 67 because the presence of the user B changes.

When the user A and the user B communicate in a step 68, "session status" which is one of the presence information of the IP phone terminal owned by the user B is turned "closed". As the IP phone terminal of the user B is in session status, that is, the user C knows that the user B is on the phone even if the user C would like to communicate with the user B, the user C can grasp that the user B does not answer the phone even if the user C calls until the user B hangs up. If the user B owns a terminal for character chat and the "session status" of the terminal for character chat is "closed", the user C knows that the terminal for character chat of the user B is in session status, that is, the user B is in chat session. At this time, as his/her ears and mouth are available though the user B utilizes his/her hands to input a character of chat, the user C can judge that he/she can communicate with the user B in emergency. Though the user A also directly communicates with the user B, the user A can grasp that the "session status" of the IP phone terminal of the user B is "closed" like the user C.

Afterward, when conversation between the user A and the user B is finished in a step 69, the IP phone terminal 46 of the user B notifies the presence server 1 of the termination of a session in a step 70 and as a result, the presence server 1 notifies the user A and the user C that the "session status" of the IP phone of the user B is idle in steps 1070, 1071.

Figure 14:
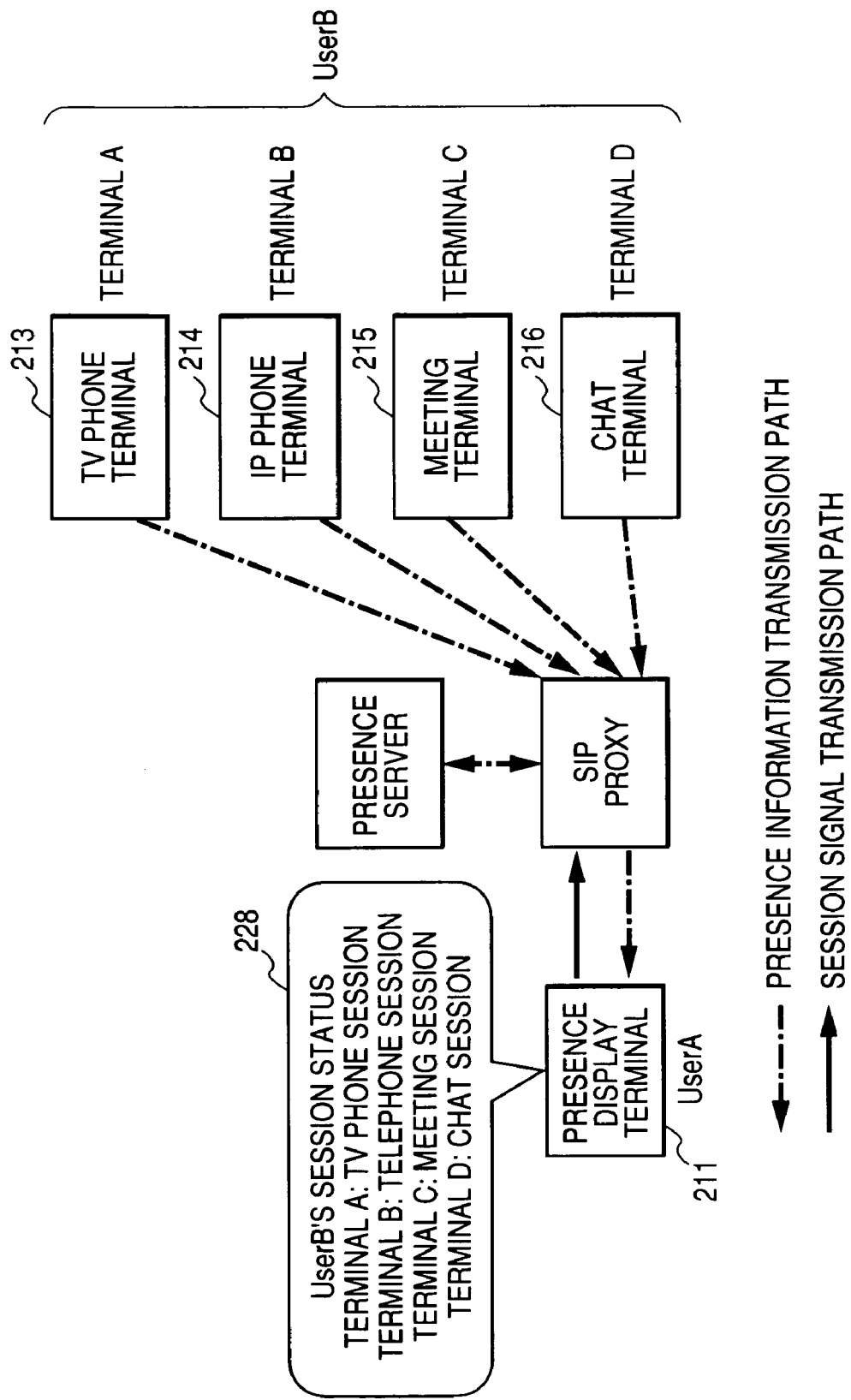
FIG. 14 shows an image of a display mode on a user terminal in case a terminal type management function according to the invention and session status are combined.

Terminal information is added to presence information notified the user A and the user B at this time in a form shown in FIG. 9. When session status is displayed on GUI of the terminals of the user A and the user C, it can be displayed by utilizing this information on what application session is established based upon a terminal type. A balloon 228 shown in FIG. 14 shows what display is actually made on GUI of the user A. A reference number 1221 shown in FIG. 15 shows an image of a table held inside the terminals of the user A and the user C and it is described how each terminal determines a display format of session status. For example, as a value in session status 1224 of a terminal A owned by the user B is "closed" and its terminal type 1225 is an IP phone, its display format 1226 is estimated to be "telephone session". This estimate depends upon a terminal and may be different every terminal. As the terminal of the user A is estimated in "telephone session", display that the terminal A of the user B is in "telephone session" is made in 228 shown in FIG. 14.

Figure 16:
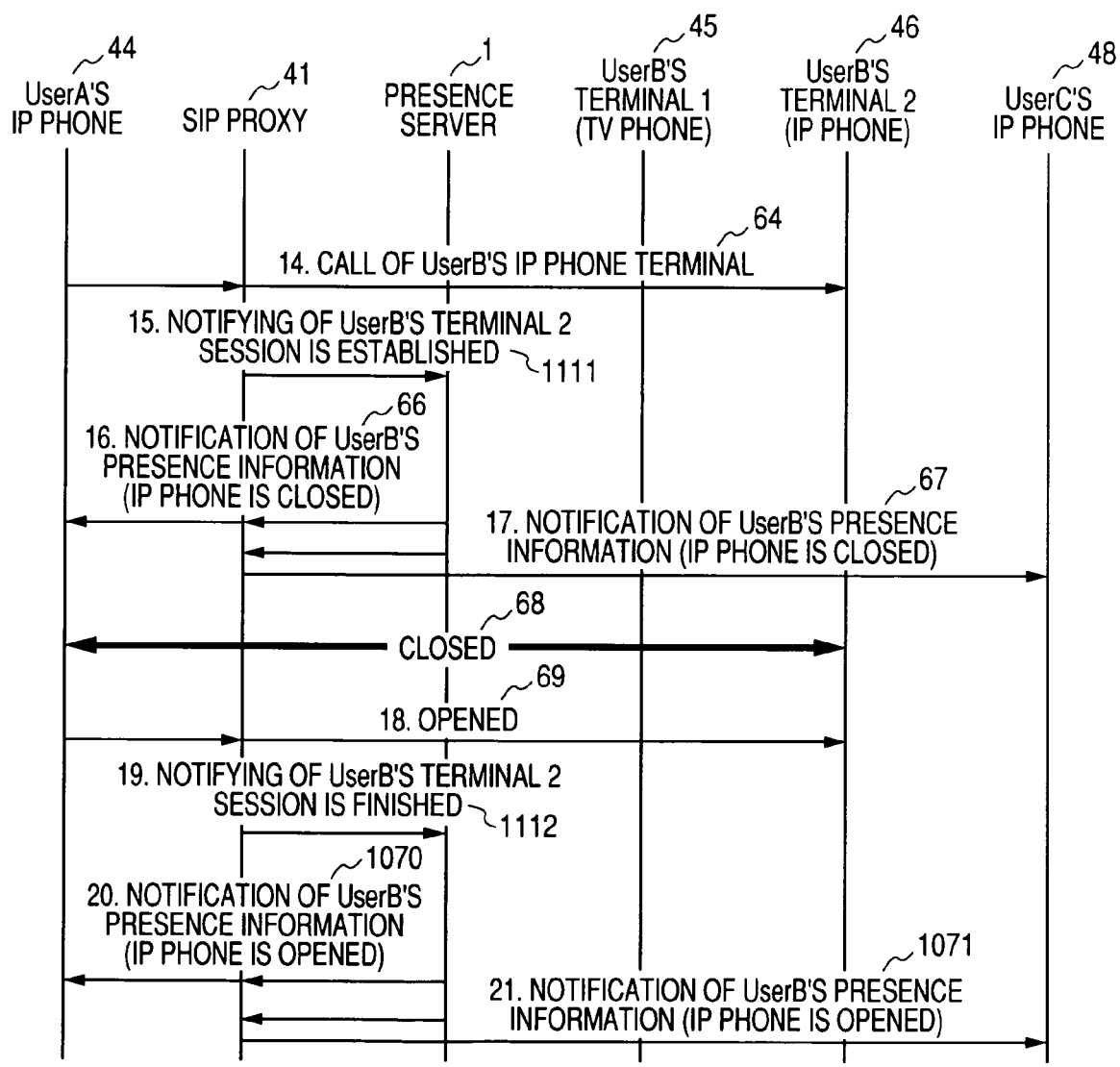
FIG. 16 shows a sequence in case an SIP server initiates/terminates a session by deputy in the sequence shown in FIG. 3.

FIG. 16 shows a case that a sequence in a part shown by 1072 in FIG. 4 is realized in another method. A sequence except the part shown by 1072 in FIG. 16 is similar to that in FIG. 4. In the sequence shown in FIG. 4, when the session of each terminal is established and when session is finished, the presence server 1 is notified of it as presence information in steps 65 and 70. In FIG. 16, this method is different from FIG. 4. In FIG. 16, each terminal does not notify the presence server 1 of the establishment/the termination of session but the SIP server 41 notifies in steps 1111, 1112. The SIP server 41 is a server for managing the session status of each terminal and also grasps the status of the establishment/the termination of the session of the user A's terminal 44 and the user B's terminal 2 denoted by 46. Therefore, the information of the establishment/the termination of session can notify the presence server 1 in place of each terminal. As the SIP server registers the session status in the presence server 1 by deputy by using this method when the session of the existing IP phone not provided with a function for notifying session status is established/finished, another user can grasp the session status of the terminal.

Figure 17:
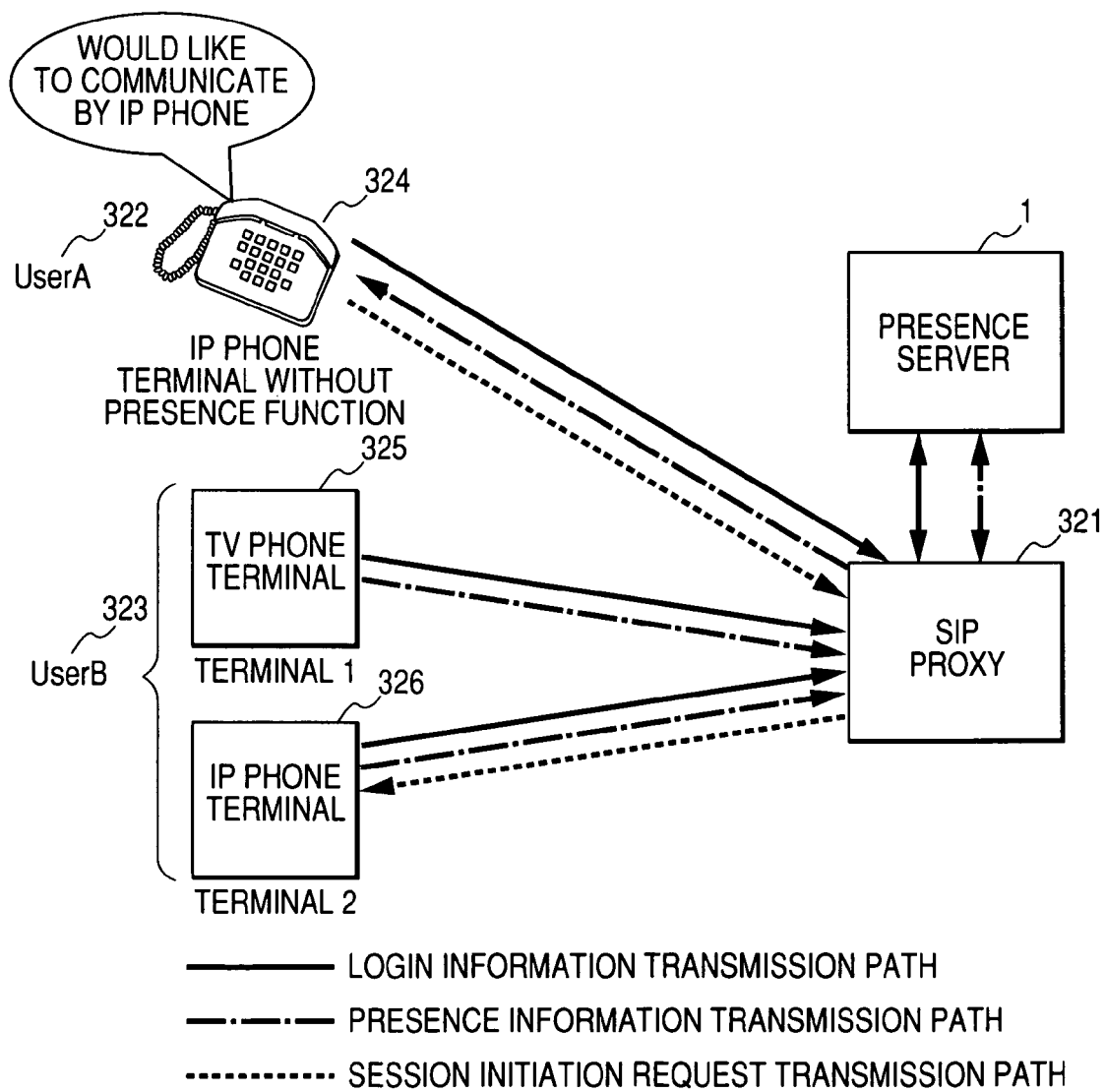
FIG. 17 shows a network showing a session mode using the presence server according to the invention.
Figure 18:
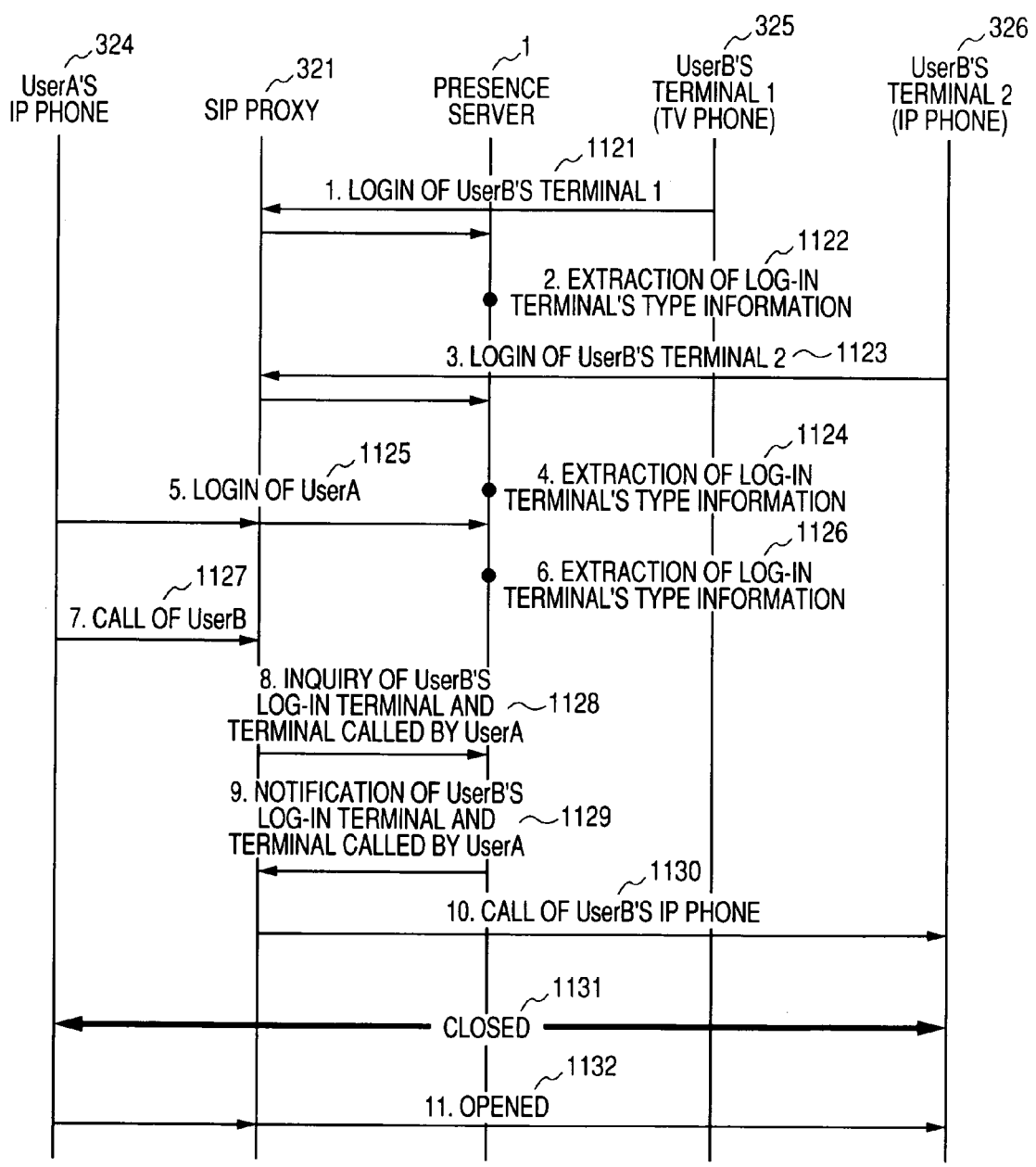
FIG. 18 shows an operational sequence in a session mode using the presence-server according to the invention.
Figure 19:
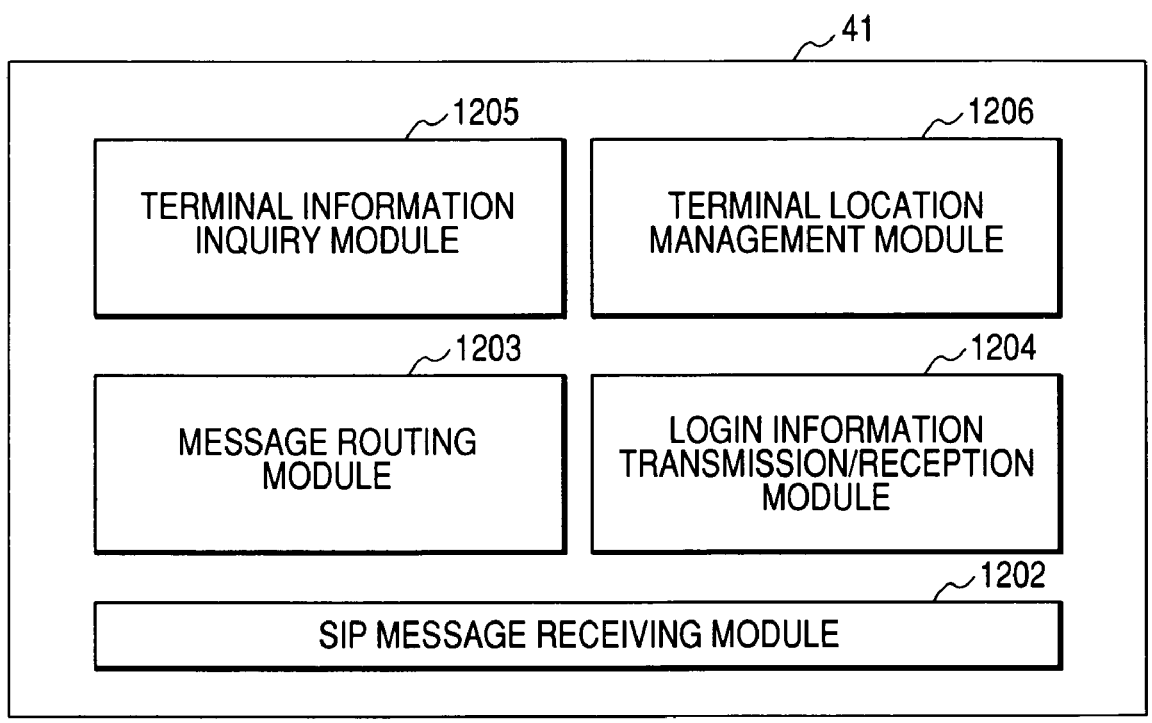
FIG. 19 is a functional block diagram showing an SIP server to which the terminal type management method according to the invention is applied.
Figure 20:
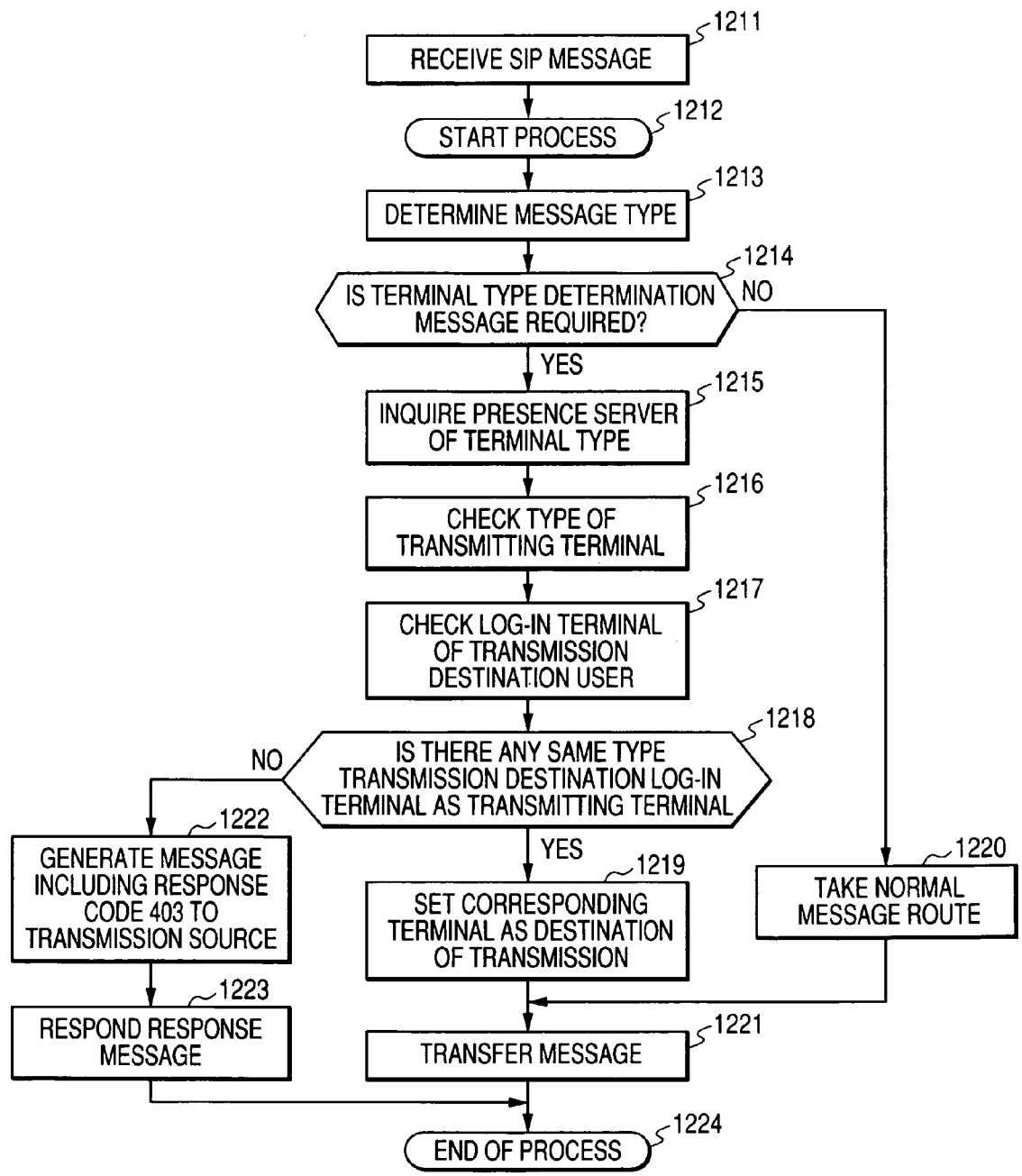
FIG. 20 is a flowchart in message routing for terminal type management in the SIP server according to the invention.
Figure 21:
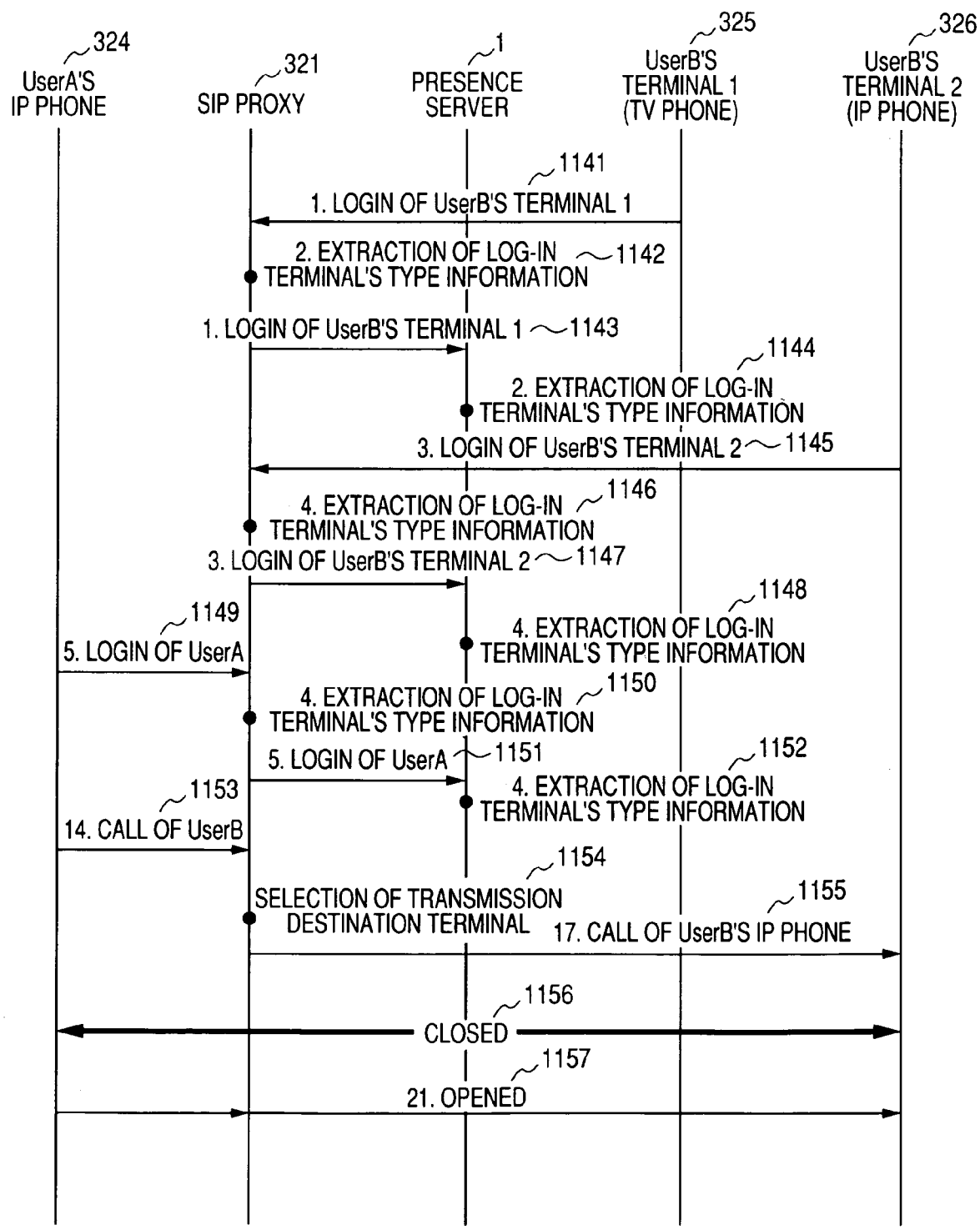
FIG. 21 shows an operational sequence in a session mode using the presence server according to the invention.
Figure 22:
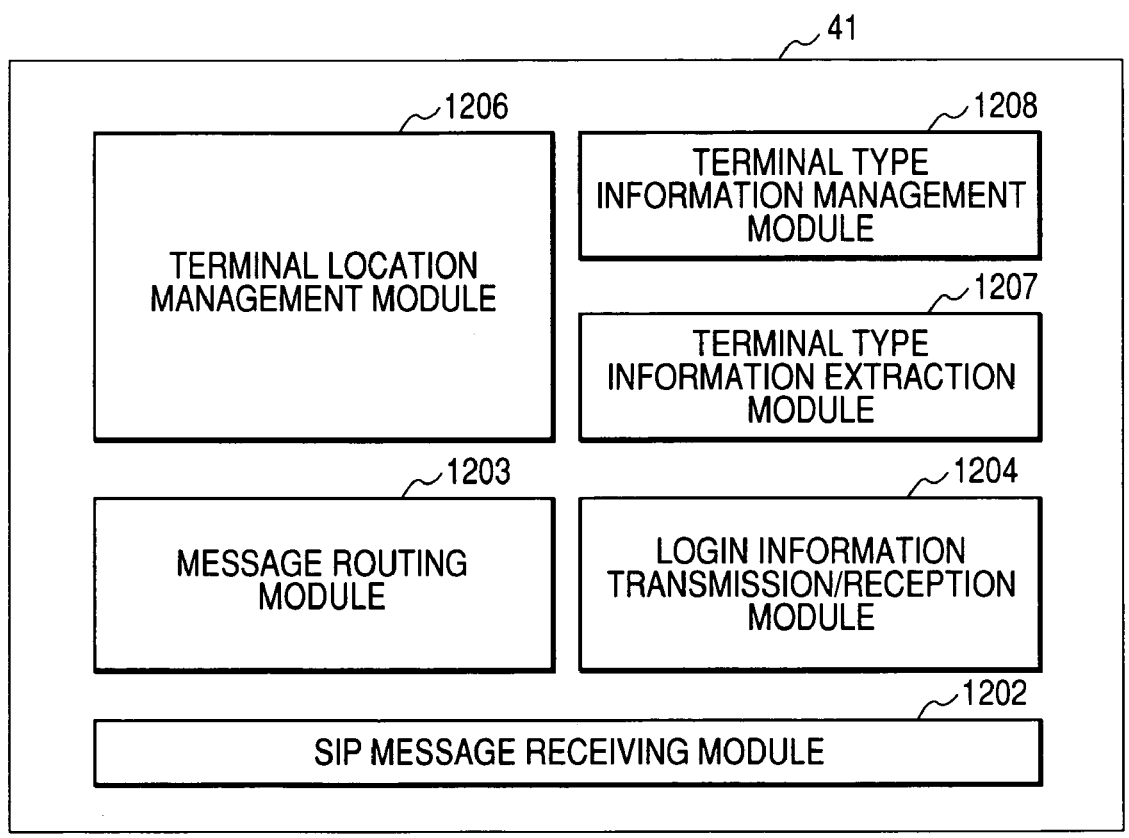
FIG. 22 is a functional block diagram showing the SIP server to which the terminal type management method according to the invention is applied.
Figure 23:
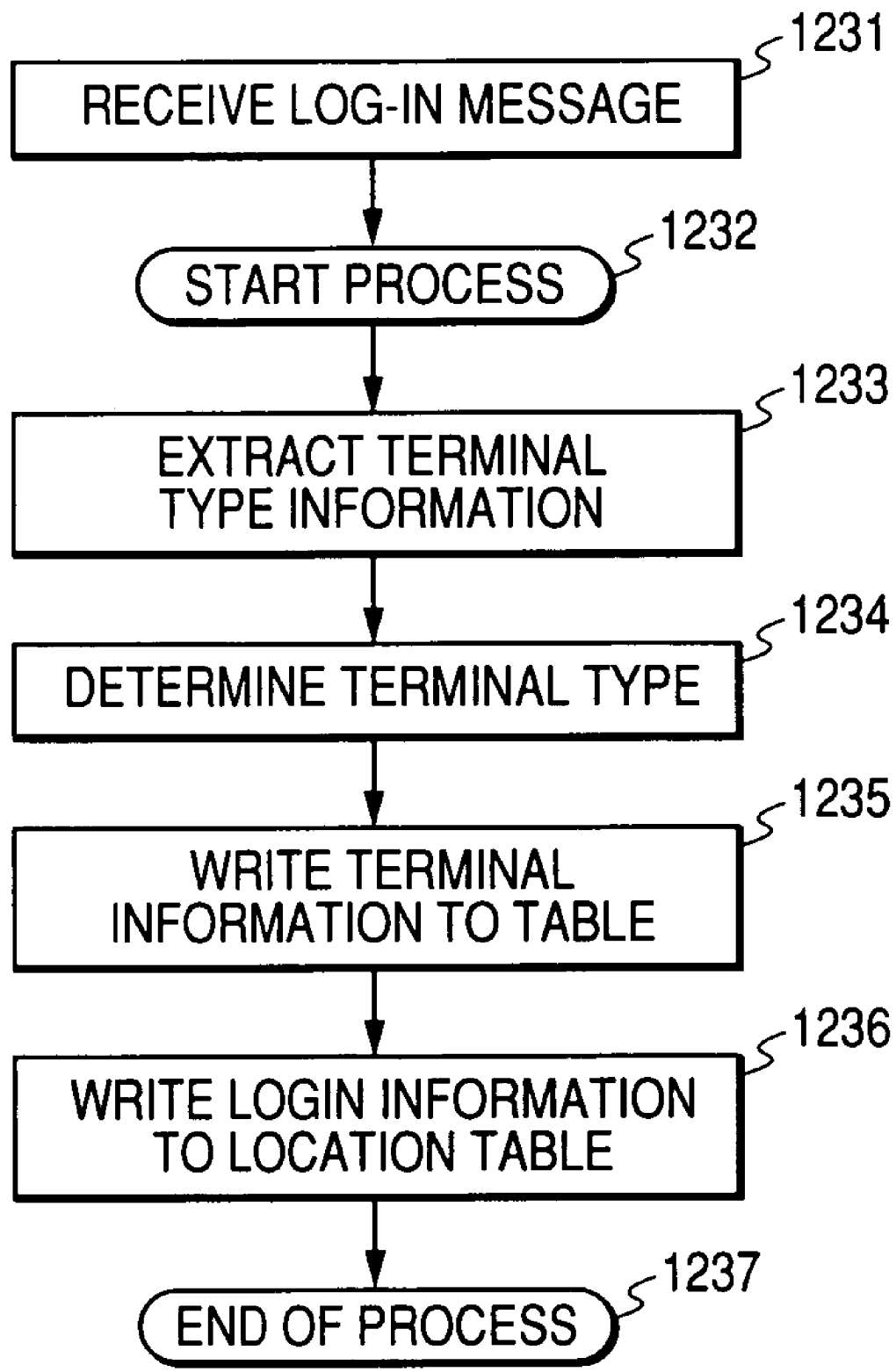
FIG. 23 is a flowchart when a terminal type is identified in the SIP server according to the invention.
Figure 24:
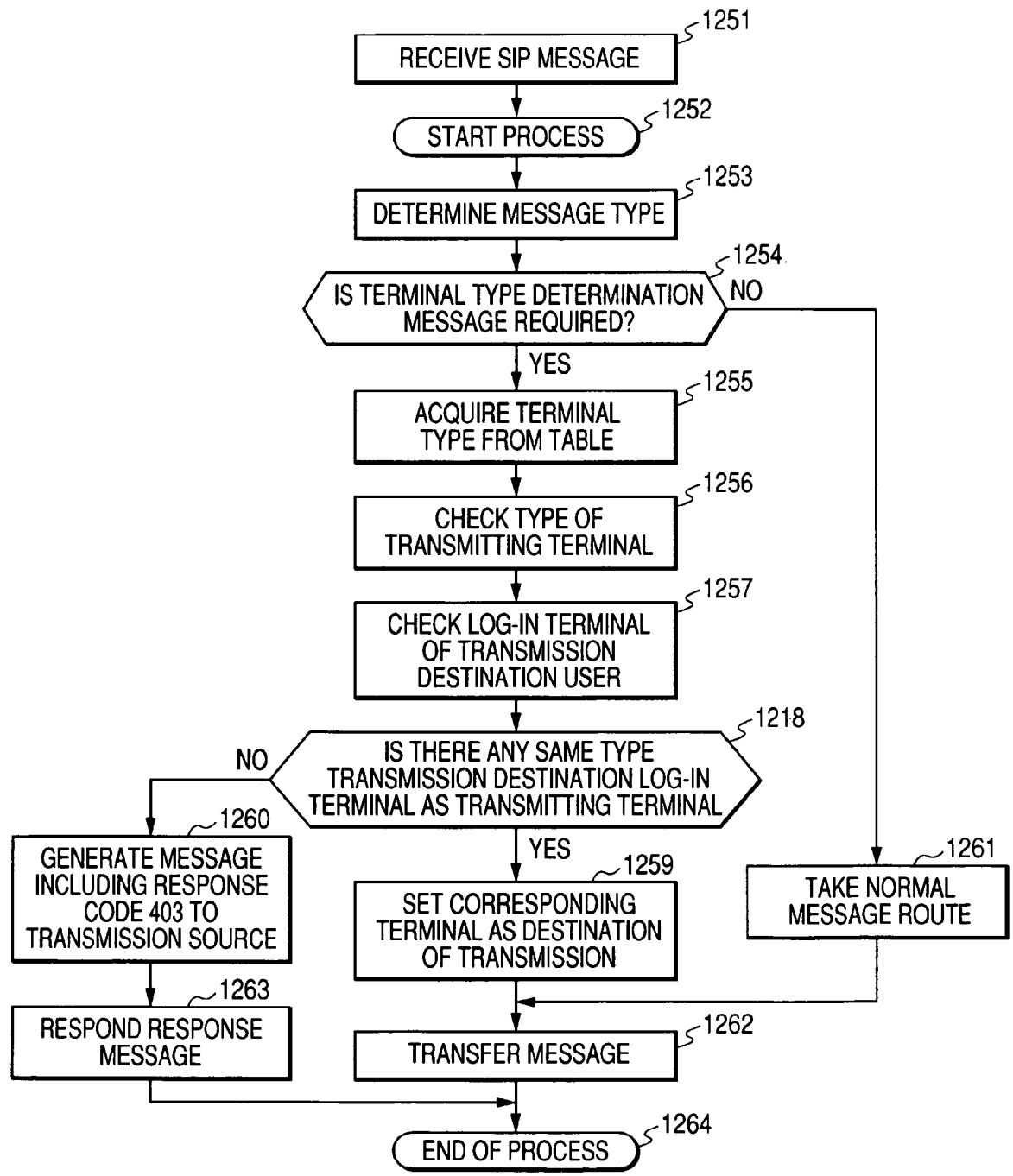
FIG. 24 is a flowchart in message routing in the SIP server according to the invention.
Figure 25:
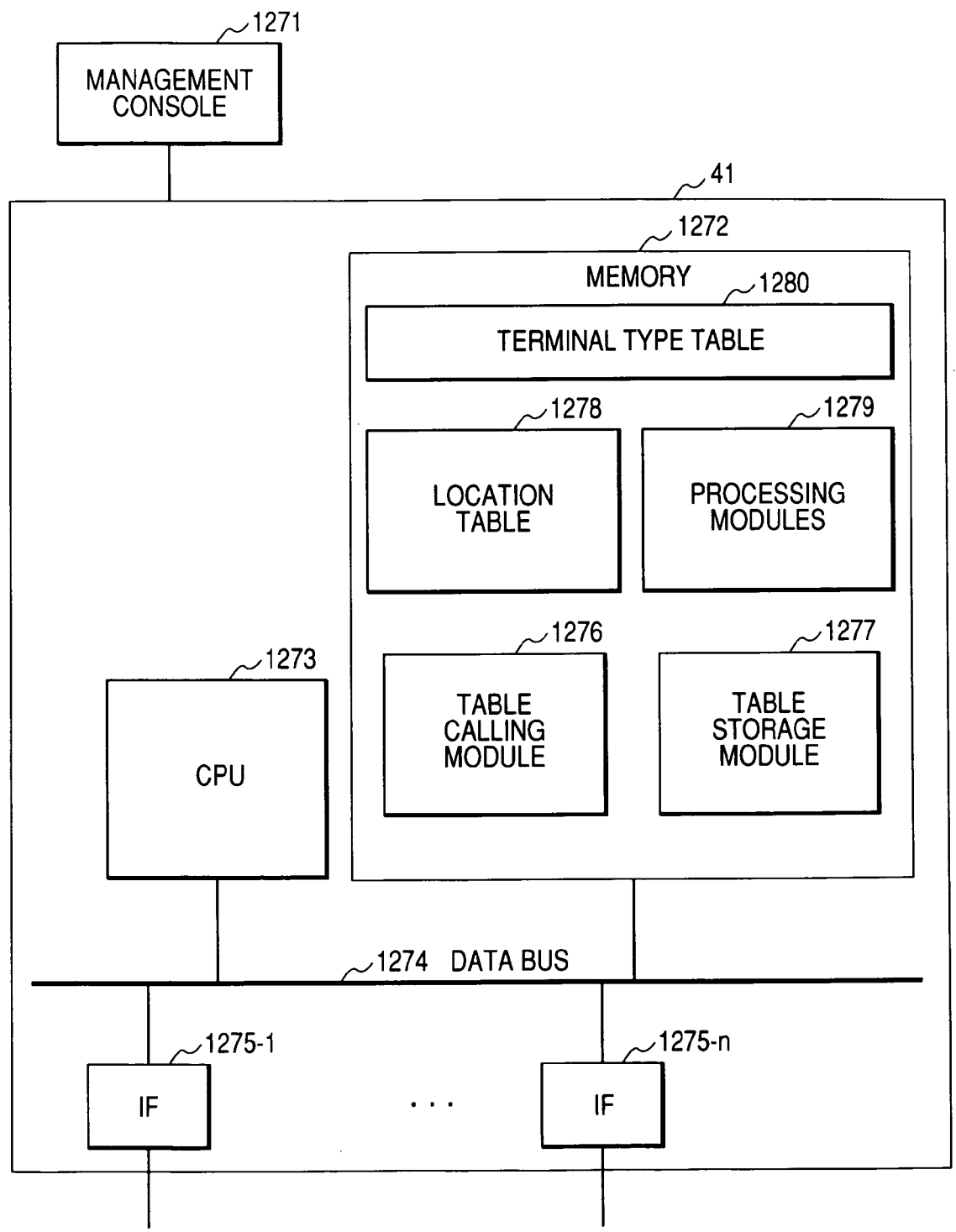
FIG. 25 shows the SIP server to which the terminal type management method according to the invention is applied.

FIG. 17 shows a network in case an SIP server 321 specifies a route in which the type of each terminal is grasped. FIG. 18 shows its sequence. FIG. 19 is a functional block diagram showing the SIP server for routing according to this method and FIG. 20 is a flowchart showing the operation of the SIP server. FIG. 21 shows a sequence in case routing in which a terminal type is grasped is realized in a different method from the method shown in FIG. 18, FIG. 22 is a functional block diagram showing an SIP server function at that time, and FIGS. 23 and 24 are flowcharts showing a process executed by an SIP server at that time. FIG. 25 is a hardware block diagram showing the SIP server adopting this method. The operation of various functional blocks shown in FIGS. 19 and 22 is stored in a processing module group 1279 in a memory 1272 as in FIGS. 1 and 2, in operation, CPU 1273 reads an operational procedure and executes the operation. Information required when an individual processing module is operated is stored in a location table 1278 and a terminal type table 1280 in the memory 1272. The functional block diagrams shown in FIGS. 19 and 22 show logical functional configuration realized by software, however, each functional block may be also configured by hardware.

First, difference between FIGS. 18, 21 and FIG. 4 will be described. In the sequence shown in FIG. 4, the terminal (the IP phone) denoted by 44 and owned by the user A acquires the type of a terminal which a partner user instructs to log in from presence information and judges that the IP phone terminal denoted by 46 out of the terminals which the user B instructs to log in should be called using the information. However, in case the IP phone terminal denoted by 44 and owned by the user A does not have a presence acquiring function with which a terminal 324 shown in FIG. 17 is provided, it cannot specify the type of a partner terminal. Therefore, this method cannot be utilized as it is. In the method shown in the sequence shown in FIGS. 18, 21, it is not the IP phone terminal denoted by 324 of a user A but the SIP server 321 which is a deputy that checks the type of a terminal which a user B instructs to log in. As a result, even if the IP phone terminal denoted by 324 and owned by the user A does not a presence information acquiring function, a call conscious of a terminal type is enabled. Referring to the sequence shown in FIGS. 18, 21, the method will be described below. Terminals 325, 326 owned by a user B denoted by 323 shown in FIG. 17 are described as separate hardware, however, as in FIG. 3, they may be also like the terminal 49 shown in FIG. 10 and the applications 45, 46.

As shown in FIG. 18, first, in a step 1121, the IP phone terminal denoted by 325 of the user B logs in the SIP server 321 and a presence server 1. At this time, in a step 1122, the presence server 1 extracts the type information of the terminal 325, however, a method is similar to the above-mentioned method. The SIP server 321 stores the information of the log-in terminal in a location table 1278 shown in FIG. 25 by a terminal location management module 1206 after the SIP server receives a login message by a login information transmission/reception module 1204 shown in FIG. 19 in terminal login. Afterward, in a step 1123, the terminal 2 denoted by 326 of the user B logs in and in a step 1125, the IP phone terminal denoted by 324 of the user A logs in, however, a procedure at that time is similar to that in the steps 1121, 1122. Next, the IP phone terminal denoted by 324 of the user A calls the user B. At this time, as the terminal 324 does not grasp the presence of the user B, it calls by specifying not his/her terminal address but the user B's address. The SIP server 321 that receives the call inquires the presence server 1 of the type of the terminal 324 of the calling user A and the type of a terminal currently instructed to log in by the called user B in a step 1128. The presence server 1 that receives the inquiry returns the result in a step 1123. Concretely, when an SIP message for calling the user B from the IP terminal 324 of the user A is received in a step 1127, the SIP server 321 receives the SIP message in a step 1211 shown in FIG. 20 and starts processing for transferring the message in a step 1212. First, the SIP server 321 discriminates the type of the message in a message routing module 1203 shown in FIG. 19 in a step 1213. When the type of the message is discriminated, it is determined whether the type of the message requires routing conscious of a terminal type or not in a step 1214.

At this time, when it is judged that the type of the message is not required to be conscious of the terminal type, control is shifted to a step 1220, normal SIP message routing is performed, the message is transferred in a step 1221, and the process is finished in a step 1224. In case the terminal type is required to be conscious, control is shifted to a step 1215. In the step 1215, the presence server 1 is inquired of the type of the IP terminal 324 of the user A who is an originator and the type of a terminal which the user B currently instructs to log in utilizing the terminal information inquiring module 1205 shown in FIG. 19. For a method of inquiring, an SIP message may be also utilized and another method may be also used. Afterward, when terminal type information is received from the presence server 1 in a step 1129 shown in FIG. 18, the type of the IP terminal 324 of the user A which is the originator is verified in a step 1216 shown in FIG. 20 and next in a step 1217, the log-in terminal and its type of the user B which is a destination of transmission are verified. In this embodiment, as the user B instructs the TV phone terminal 325 and the IP phone terminal 326 to log in, it is verified. Next, in a step 1218, the message routing module 1203 checks whether the user B instructs a terminal of the same type as the IP phone terminal 324 of the user A which is the originator to log in or not. In case the user B who is the destination of the transmission does not instruct a terminal of the same type as the originator to log in, no session comes into effect even if the message is transferred to any terminal instructed to log in by the user B.

Therefore, the SIP server 321 transfers no message, generates a response message 403 showing that the user A who is the originator cannot communicate in a step 1222, returns the response message to the user A in a step 1223, and terminates the process in a step 1224. In this embodiment, as the user B instructs the IP phone terminal 326 to log in, the terminal of the same type exists at the destination of transmission. Therefore, the process proceeds to a step 1219, an address of a transfer destination of a calling message is set in the IP phone terminal 326 of the user B, and in a step 1221, the message is transmitted. In a step 1224, the process is finished.

As a result, the message for calling the user B from the user A is transferred from the SIP server 321 to the IP phone terminal 326 of the user B in a step 1130 shown in FIG. 18 and conversation is started in a step 1131. Afterward, in a step 1132, the conversation is finished.

FIG. 21 shows a sequence in case the SIP server 321 realizes message routing conscious of a terminal type without using the method shown in FIG. 18. A part different from FIG. 18 is a method when the SIP server 321 checks the type of each terminal. In FIG. 18, it is realized by inquiring the presence server 1, however, in FIG. 21, the SIP server 321 is provided with the similar terminal type extracting function to the presence server 1 and the SIP server grasps the terminal type when login information is received. The details of FIG. 21 will be described below.

In FIG. 21, as in FIG. 18, first, in a step 1141, the TV phone terminal 325 of the user B logs in the SIP server 321 and the presence server 1. Next, the SIP server 321 extracts the type of a log-in terminal in a step 1142 before the SIP server transfers a log-in message to the presence server 1. Concretely, after a log-in message is received in a step 1231 shown in FIG. 23, processing for grasping a terminal type is executed in a step 1232. When the processing is started, a terminal type information extraction module 1207 shown in FIG. 22 extracts terminal type information from the log-in message in a step 1233. The contents of the processing are completely similar to processing when the presence server 1 grasps the terminal type and material for determining the terminal type is extracted from a header, a parameter and others of REGISTER message which is the log-in message. Next, in a step 1234, the terminal type is determined, however, this process is also similar to a case of the presence server 1. Determined terminal information is registered in the terminal type table 1280 in the memory 1272 shown in FIG. 25 in the step 1225. Besides, login information is registered in a location table 1278 in the memory 1272 shown in FIG. 25 in a step 1236 and the process is finished in a step 1237. Afterward, the SIP server 321 transfers the login information to the presence server 1 in the step 1143 shown in FIG. 21.

The processing of the presence server 1 in the afterward step 1143 is similar to the above-mentioned processing. Afterward, the IP phone terminal 326 of the user B and the IP phone terminal 324 of the user A log in in steps 1145, 1149, however, the procedures of the SIP server 321 and the presence server 1 at that time are similar to the case of the step 1141. Afterward, in a step 1153, the IP phone 324 of the user A calls the user B. The SIP server 321 judges which of terminals which the user B instructs to log in should be called in a step 1154, however, a sequence procedure is different from that shown in FIG. 18, the SIP server 321 does not inquire the presence server 1 of terminal type information but retrieves terminal type information in the terminal type table 1280 in the memory 1272 shown in FIG. 25. Concretely, processing is executed according to a flowchart shown in FIG. 24. The flowchart shown in FIG. 24 is similar to that shown in FIG. 19 except a step 1255. In the step 1255, the terminal type information management module 1208 shown in FIG. 22 is inquired of the types of the terminal 324 of the user A, the terminal 1 denoted by 325 of the user B and the terminal 2 denoted by 326. Afterward, as a result of selecting a transmission destination terminal inside the SIP server 321 in the step 1154, the SIP server 321 transfers a message for calling the user B from the user A to the terminal 2 denoted by 326 of the user B, that is, the IP phone terminal in a step 1155. As a result, in a step 1156, conversation is started and afterward, in a step 1157, the conversation is finished.

What is claimed is:

1. A session control server for communication control between plural terminals, comprising:

a line interface to be coupled via a network to plural first terminals related to a first user which can use at least the first terminals and to plural second terminals related to a second user which can use the partner terminal, and said line interface being coupled via a network to a presence server to be stored with terminal type information and session status information between one of the first terminals and one of the second terminals which communicates with said one first terminal in a state in which the respective information is related; and a controller coupled to the line interface;

wherein the controller extracts the terminal type information of one of the first terminals of a packet received via the line interface from header information of the received packet, the controller acquires, from the presence server, terminal type information of one of said second terminals as a destination of the received packet, the controller selects a second terminal among the second terminals to be communicated between the first user and the second user on the basis of the extracted terminal type information of said one first terminal, and the controller transfers a message for the second user to the selected second terminal, the message which is received from one of the first terminal, wherein the terminal type information comprises information regarding a hardware configuration of the terminal.

2. A session control server according to claim 1, wherein the controller selects the same terminal type between said one second terminal and said one first terminal when determining which one of the second terminals to be selected.

3. A session control server according to claim 1, wherein the controller extracts a message type of a packet received via the line interface from header information of the received packet, and the controller determines whether a terminal type of the second terminal is required to select or not on the basis of the message type of the received packet.

4. A communication control system comprising:

a session control server for communication control between plural terminals to be coupled, via a network, to plural first terminals related to a first user which can use at least the first terminals and to plural second terminals related to a second user which can use the second terminals; and a presence server coupled, via a network, to the session control server, wherein the presence server stores terminal type information and session status information between one of the first terminals and one of the second terminals which communicates with said one first terminal in a state in which the respective information is related, the session control server extracts terminal type information of one of the first terminals of a packet received via the line interface from header information of the received packet, the session control server acquires, from the presence server, terminal type information of one of the second terminals as a destination of the received packet, the session control server selects a second terminal among the second terminals to be communicated between the first user and the second user on the basis of the extracted terminal type information of said one first terminal, and the session control server transfers a message for the second user to the selected second terminal, the message which is received from one of the first terminal, wherein the terminal type information comprises information regarding a hardware configuration of the terminal.

5. A session control server according to claim 1, wherein a terminal type is a chat terminal, a meeting terminal, an IP phone, or a TV phone.

6. A communication control system according to claim 4, wherein a terminal type is a chat terminal, a meeting terminal, an IP phone, or a TV phone.

* * * * *

UNITED STATES PATENT AND TRADEMARK OFFICE
CERTIFICATE OF CORRECTION

PATENT NO. : 7,668,911 B2 Page 1 of 1
APPLICATION NO. : 11/050015
DATED : February 23, 2010
INVENTOR(S) : Miyata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Seventh Day of December, 2010

David J. Kappos
*Director of the United States Patent and Trademark Office*